(12) United States Patent
Schwarm et al.

(10) Patent No.: US 11,386,336 B2
(45) Date of Patent: Jul. 12, 2022

(54) MACHINE LEARNING CLASSIFIER AND PREDICTION ENGINE FOR ARTIFICIAL INTELLIGENCE OPTIMIZED PROSPECT DETERMINATION ON WIN/LOSS CLASSIFICATION

(71) Applicant: THE DUN & BRADSTREET CORPORATION, Short Hills, NJ (US)

(72) Inventors: Alexander T. Schwarm, Austin, TX (US); James Beveridge, Brooklyn, NY (US); Nalanda Matia, Chatham, NJ (US); Granger Huntress, Austin, TX (US); Bradley White, Easton, PA (US); Karolina Kierzkowski, Linden, NJ (US); Nicholas Lizotte, Holbrook, MA (US)

(73) Assignee: THE DUN AND BRADSTREET CORPORATION, Short Hills, NJ (US)

( * ) Notice: Subject to any disclaimer, the term of this patent is extended or adjusted under 35 U.S.C. 154(b) by 1061 days.

(21) Appl. No.: 15/724,687

(22) Filed: Oct. 4, 2017

(65) Prior Publication Data
US 2018/0101771 A1    Apr. 12, 2018

Related U.S. Application Data

(60) Provisional application No. 62/404,951, filed on Oct. 6, 2016.

(51) Int. Cl.
*G06N 5/02*     (2006.01)
*G06N 20/00*    (2019.01)
(Continued)

(52) U.S. Cl.
CPC .............. *G06N 5/022* (2013.01); *G06N 7/005* (2013.01); *G06N 20/00* (2019.01); *G06N 20/20* (2019.01); *G06Q 10/105* (2013.01)

(58) Field of Classification Search
CPC ....... G06N 5/022; G06N 7/005; G06Q 10/105
See application file for complete search history.

(56) References Cited

U.S. PATENT DOCUMENTS 7,822,757 B2    10/2010    Stoker et al.
8,346,790 B2     1/2013    Stoker et al.
(Continued)

FOREIGN PATENT DOCUMENTS

WO    2016138041    9/2016

OTHER PUBLICATIONS

International Preliminary Report on Patentability dated Nov. 1, 2018 from corresponding International PCT Patent Application PCT/US2017/055085, 8 pages.
(Continued)

*Primary Examiner* — George Giroux
(74) *Attorney, Agent, or Firm* — Ohlandt, Greeley, Ruggiero and Perle, LLP

(57) ABSTRACT

Embodiments of a system and method for identifying and prioritizing company prospects by training at least one classifier on client company win/loss metrics. One or more classifiers can be trained on a training database compiled from company win/loss database for a client and firmographic data from a robust business entity database. Once trained, the system can employ Artificial Intelligence powered by the trained classifiers to classify and output customized prospect lists of thousands of profiled and scored companies that the AI has determined are likely targets for specific marketing and sales. The AI can also ingest databases of client targets and classify and score them based on the custom-trained classifier.

32 Claims, 12 Drawing Sheets

(51) Int. Cl.
*G06N 20/20* (2019.01)
*G06N 7/00* (2006.01)
*G06Q 10/10* (2012.01)

(56) References Cited

U.S. PATENT DOCUMENTS

| | | | |
|---|---|---|---|
| 2004/0133466 A1 | 7/2004 | Redmond et al. | |
| 2008/0162487 A1* | 7/2008 | Richter | G06Q 10/06398 |
| 2012/0232955 A1 | 9/2012 | Riazzi et al. | |
| 2012/0278091 A1 | 11/2012 | Yaseen et al. | |
| 2012/0290330 A1 | 11/2012 | Coleman et al. | |
| 2013/0090987 A1* | 4/2013 | Cohen | G06Q 30/0202 |
| | | | 705/7.34 |
| 2014/0278754 A1* | 9/2014 | Cronin | G06Q 30/0201 |
| | | | 705/7.29 |
| 2015/0227861 A1* | 8/2015 | Everton | G06F 16/958 |
| | | | 705/342 |
| 2016/0071117 A1 | 3/2016 | Duncan | |
| 2016/0071118 A1* | 3/2016 | Chiao | G06N 5/025 |
| | | | 705/7.29 |
| 2016/0071134 A1 | 3/2016 | Duncan | |
| 2016/0225017 A1 | 8/2016 | Wong et al. | |
| 2017/0124458 A1* | 5/2017 | Jayaraman | G06N 5/02 |
| 2017/0206560 A1* | 7/2017 | Kusumura | G06Q 30/0242 |

OTHER PUBLICATIONS

Extended European Search Report dated May 4, 2020 in corresponding European Patent Application No. 17859094.9, 5 pages.
International Search Report dated Dec. 28, 2017 from corresponding International PCT Application PCT/US2017/055085, 3 pages.
Written Opinion dated Dec. 28, 2017 from corresponding International PCT Application PCT/US2017/055085, 8 pages.

* cited by examiner

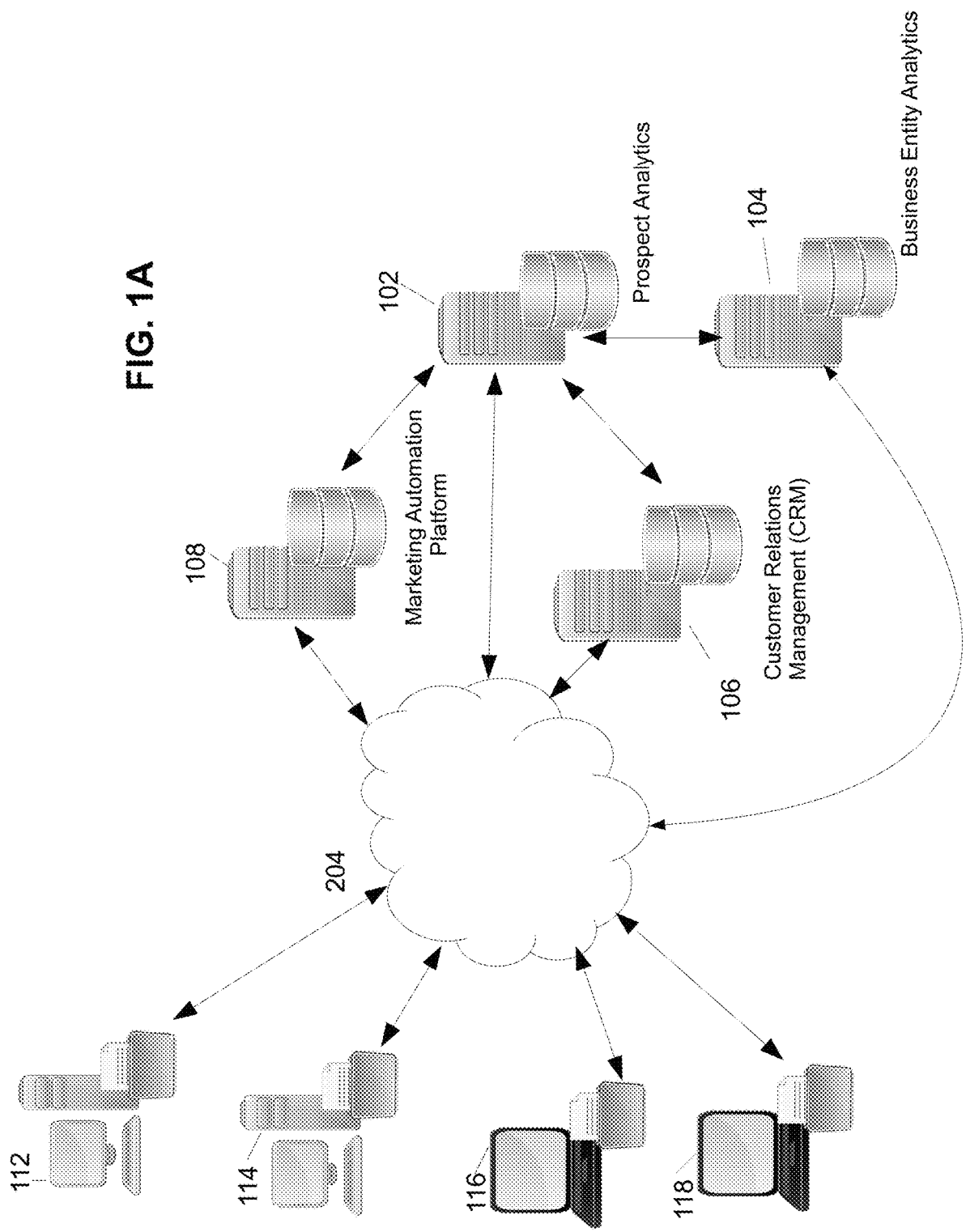

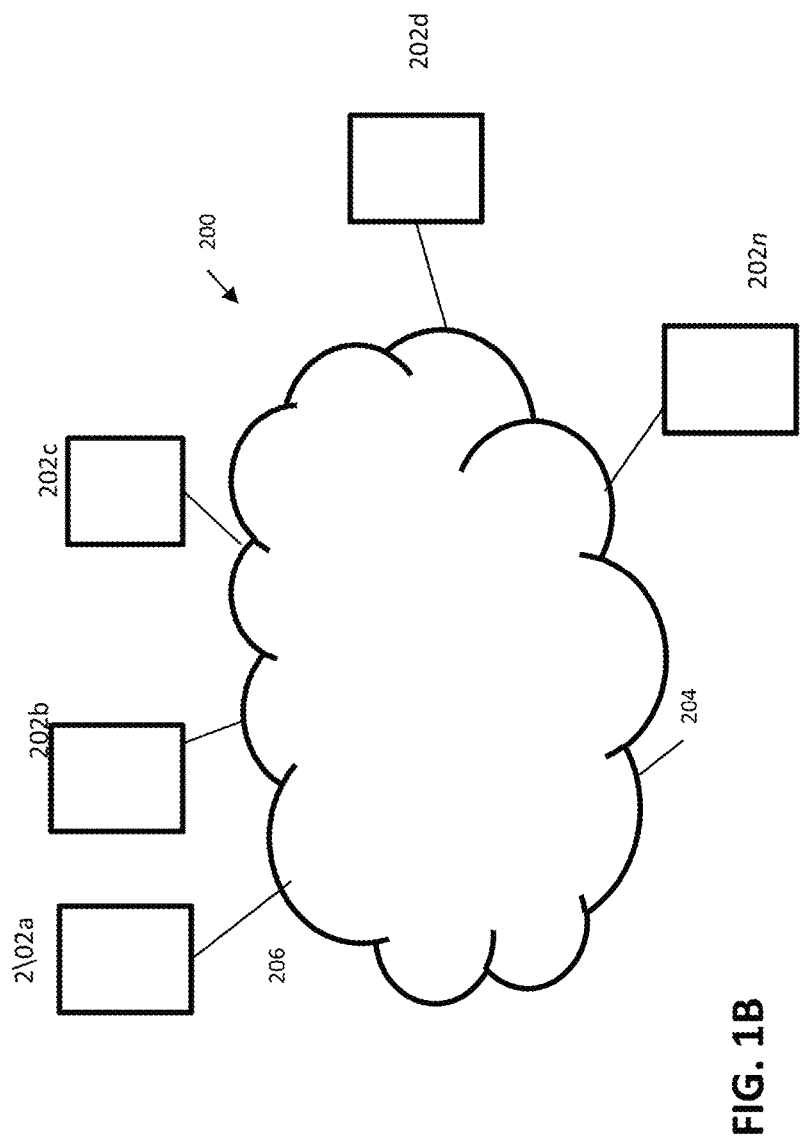

FIG. 7

MACHINE LEARNING CLASSIFIER AND PREDICTION ENGINE FOR ARTIFICIAL INTELLIGENCE OPTIMIZED PROSPECT DETERMINATION ON WIN/LOSS CLASSIFICATION

CROSS REFERENCE TO RELATED APPLICATION

The present application claims priority to U.S. Provisional Patent Application No. 62/404,951, filed on Oct. 6, 2016, the entirety of which is incorporated by reference hereby.

TECHNICAL FIELD

Disclosed are embodiments directed to Artificial Intelligence (AI) machine learning and analysis of business entities.

DESCRIPTION OF RELATED TECHNOLOGY

Marketing and sales groups must continually identify new potential sales targets and prioritize leads as they come in. The four use cases that are the most common include cross-selling, upselling, renewal/re-order (for annuity-based or consumption-based sales), and new customer acquisition. Cross-selling is related to selling to related potential customers and is typically executed through analyzing company linkage. Upselling is typically selling higher-value products to potential or existing customers. New customer acquisition is either penetrating a new market at an existing customer or selling to an altogether new customer. Typically, the customer targets are constrained to a combination of different criteria and then rated based upon other criteria. The constraints are typically related to the type of business, appropriate legal standing, the location, and other information related to whether or not the customer can utilize the product or service offered. Included in these location constraints can be items like legal jurisdiction and logistical requirements for sales, support, delivery, and related items. In order to identify the "best" targets, there are a multitude of potential candidate data items for analysis. The most common items used for this are things like linkage (especially for cross-selling and upselling), business type (e.g., SIC code), location, growth rates (e.g., employees and revenue), commercial credit scores, and revenue. The choice of these different terms can be a daunting task and complicates the resulting target prioritization.

SUMMARY

In at least one embodiment, described is a system comprising: a transceiver for communicating over a network; a memory for storing at least instructions; a processor device that is operative to execute program instructions; a training database comprising a list of company engagements, and, for each engagement, a company identifier, wherein the list comprises won company engagements, and company entity data mapped to each company, the company entity data comprising firmographic data from a business entity information database; a classification engine comprising at least one classifier configured to identify company prospects, the classification engine being configured to train the classifier on the training data in the training database to identify one or more attractive classes and one or more unattractive classes to classify company prospects.

In at least one of the various embodiments, the company engagements can comprise a list of customers. In at least one of the various embodiments, the list of company engagements can comprise, for at least one of the engagements, a begin time for when the company became a customer. In at least one of the various embodiments, the list of company engagements can comprise, for at least one of the engagements, a customer revenue value. In at least one of the various embodiments, the list of won company engagements can comprise a sale of a product or service In at least one of the various embodiments, the list of won company engagements can comprise a response to a marketing message.

In at least one of the various embodiments, the training database can comprise a list of lost company engagements. In at least one of the various embodiments, the list of company engagements can comprise one or more employee identifiers. In at least one of the various embodiments, the list of lost company engagements can comprise, for at least one lost company engagement, a when lost value and a why lost value. In at least one of the various embodiments, the why lost value can include a value selected from at least one of a value for return on investment (ROI) data and a value for competitor data. In at least one of the various embodiments, the lost company engagement can comprise: at least one of a non-response to a marketing engagement or a lost sale of a product or service.

In at least one of the various embodiments, the classifier engine can comprise a machine learning classifier model builder selected from the group of: a decision tree, a random forest modeler, a cluster modeler, a K Means Cluster modeler, a neural net, a gradient boosted trees machine modeler, and a support vector machine (SVM).

In at least one of the various embodiments, the classifier engine can comprise a company profile classifier trained on the training database and configured to identify one or more company profile company classifications, including at least one company profile based on at least one of the attractive classes. In at least one of the various embodiments, the classifier engine can comprise a machine learning classifier model builder comprising a K-Means Cluster modeler. In at least one of the various embodiments, the classifier engine can include at least one weight parameter selected from the group of: a weight parameter configured to prefer more recent customers for the attractive classification; and a weight parameter configured to prefer higher revenue per customer for the attractive classification. In at least one of the various embodiments, the machine learning classifier builder can be configured to train on firmographic data from a begin time for company win or loss engagements. In at least one of the various embodiments, the machine learning classifier builder can be configured to train on company metric data, the company metric data comprising company state data, wherein the company state data includes at least one of financial state, company growth, and company viability.

In at least one of the various embodiments, the classifier engine can comprise a prediction engine comprising the at least one classifier, the prediction engine being configured to calculate a probability score for a company prospect classification. In at least one of the various embodiments, the prediction engine can be configured to calculate a revenue associated with a class. In at least one of the various embodiments, the class is an unattractive classification can include a sales loss, and the revenue can include a negative revenue representing an estimated opportunity cost. In at least one of the various embodiments, the probability score can be calculated as the probability of a company being a member of the class multiplied by the revenue value, and the probability score can be calculated separately for each product or service the client user sells. In at least one of the various embodiments, the predictive engine can be trained on a random forest decision tree. In at least one of the various embodiments, the system can also comprise a company profile classifier trained on the K-means cluster model builder.

In at least one of the various embodiments, wherein the list can comprise, for one or more of the companies listed, an identifier comprising at least one of a company address, a website, a phone number, an email address, and an employee identifier. The employee identifier can comprise, for example, an employee name, an employee title, or employee contact information.

In at least one of the various embodiments, the list of company engagements can comprise one or more employee identifiers and the system is configured to train the classifier to classify company prospects including company employee identifiers.

In at least one of the various embodiments, the classifier model builder can be configured to train at least one classifier for a prediction engine, the prediction engine being configured to calculate a probability score for a company prospect classification for the company employee identifier.

In at least one of the various embodiments, the system can be configured to at least: access the business entity database for employee data for the company prospect, the employee data comprising at least one of contact data or cookie data, and provide a user interface for a client user with a plurality of the scored prospects that includes the employee data for the company prospect.

In at least one of the various embodiments, disclosed is a method being performed by a computer system that comprises one or more processors, a memory operatively coupled to at least one of the processors, and a computer-readable storage medium encoded with instructions executable by at least one of the processors and operatively coupled to at least one of the processors, the method comprising: receiving into memory a company engagement database comprising a list of company engagements for a client user, wherein the list comprises won company engagements; compiling a training database comprising company entity data linked to each company, the company entity data comprising firmographic data from a business entity information database; training at least one classifier on the training data in the training database to train the classifier to identify one or more attractive classes and one or more unattractive classes to classify company prospects; outputting the at least one classifier to a classification engine; running the classifier on a database comprising company entity data and firmographic data to identify prospect companies classified as attractive; and outputting a database of company prospects to a client user interface.

In at least one of the various embodiments, the list of company engagements can comprise a list of customers.

In at least one of the various embodiments, the training database can comprise a list of lost company engagements.

In at least one of the various embodiments, the method can comprise: training the at least one classifier on a machine learning classifier model builder selected from the group of: a decision tree, a random forest modeler, a cluster modeler, a K means cluster modeler, neural nets, a gradient boosted trees machine modeler, and support vector machines (SVM).

In at least one of the various embodiments, the method can comprise: training a company profile classifier config-ured to identify one or more company profile company classifications, including at least one company profile based on at least one of the attractive classes In at least one of the various embodiments, the method can comprise: training the company profile classifier on a machine learning classifier model builder comprising a K-Means Cluster modeler. In at least one of the various embodiments, the database can comprise company entity data and firmographic data can be the business entity information database.

In at least one of the various embodiments, the method can comprise: training at least one classifier for a prediction engine, the prediction engine being configured to calculate a probability score for a company prospect classification. In at least one of the various embodiments, the method can comprise: training the classifier for the prediction engine on a random forest decision tree. In at least one of the various embodiments, the database comprising company entity data and firmographic data is a database compiled from new company prospects and firmographic data for the company prospects from the business entity information database.

In at least one of the various embodiments, the list of company engagements can comprise one or more employee identifiers and the system can be configured to train the classifier to classify company prospects including the company employee identifier.

In at least one of the various embodiments, the method can comprise training at least one classifier for a prediction engine, the prediction engine being configured to calculate a probability score for a company prospect classification for the company employee identifier.

In at least one of the various embodiments, the method can comprise accessing the business entity database for employee data, the employee data comprising at least one of contact data or cookie data; and providing the user interface for a client user with a plurality of the scored prospects that includes the employee data for the company prospect.

Among other advantages. the system employs artificial intelligence to identify new leads or prospects as well as a prioritize new leads or prospects as they are acquired in seconds or less.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIGS. 1A-1B is a system diagram of an environment in which at least one of the various embodiments may be implemented;

FIG. 7 illustrates and exemplary client user interface showing customer profiles;

DETAILED DESCRIPTION OF THE EMBODIMENTS

Figure 2:
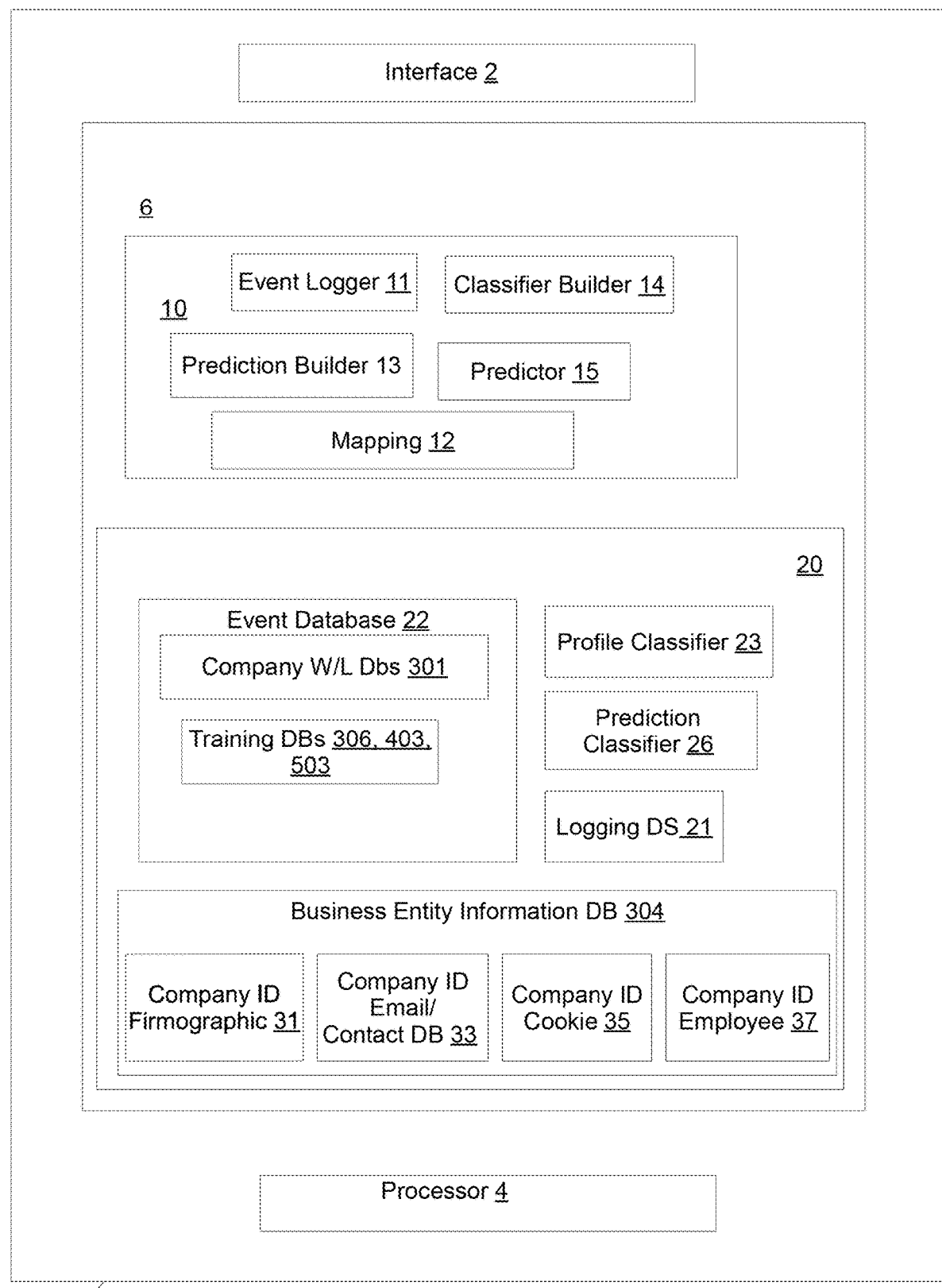
FIG. 2 illustrates an embodiment of a network computer that may be included in a system such as that shown in FIGS. 1A-1B.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of a hardware embodiment, a software embodiment, or an embodiment combining software and hardware aspects.

Throughout the specification and claims, the following terms take the meanings explicitly associated herein, unless the context clearly dictates otherwise. The term "herein" refers to the specification, claims, and drawings associated with the current application. The phrase "in at least one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used in this application, the terms "component," "module" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments include the methods described and may be implemented using one or more apparatus, such as processing apparatus coupled to electronic media. Embodiments may be stored on an electronic media (electronic memory, RAM, ROM, EEPROM) or programmed as computer code (e.g., source code, object code or any suitable programming language) to be executed by one or more processors operating in conjunction with one or more electronic storage media.

Illustrative Logical System Architecture and Environment

FIG. 1A illustrates a logical architecture and environment for a system 100 in accordance with at least one of the various embodiments. In at least one of the various embodiments, Prospect Analytics Server 102 can be arranged to be in communication with Business Entity Analytics Server 104, Customer Relation Management Server 106, Marketing Automation Platform Server 108, or the like.

In at least one of the various embodiments, Prospect Analytics Server 102 can be one or more computers arranged for AI predictive analytics for company profile and prospect generation as described herein. In at least one of the various embodiments, Prospect Analytics Server 102 can include one or more computers, such as, network computer 1 of FIG. 2, or the like.

In at least one of the various embodiments, Business Entity Analytics Server 104 can be one or more computers arranged to provide business entity analytics, such as, network computer 1 of FIG. 2, or the like. As described herein, Business Entity Analytics Server 104 can include a database of robust company/business entity data 304 and employee data to enrich company win/loss event databases 301 as described herein. Examples of Business Entity Analytics Servers 104 are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is incorporated by reference herein. In at least one of the various embodiments, Business Entity Analytics Servers 104 can include one or more computers, such as, network computer 1 of FIG. 2, or the like.

In at least one of the various embodiments, CRM Servers 106, can include one or more third-party and/or external CRM services that host or offer services for one or more types of customer databases that are provided to and from client users. For example, CRM servers 106 can include one or more web or hosting servers providing software and systems for customer contact information like names, addresses, and phone numbers, and tracking customer event activity like website visits, phone calls, sales, email, texts, mobile, and the like. In at least one of the various embodiments, CRM servers can be arranged to integrate with Prospect Analytics Server 102 using API's or other communication interfaces. For example, a CRM service can offer a HTTP/REST based interface that enables Prospect Analytics Server 102 to accept customer win/loss databases 301 which include company names and win/loss events that can be processed by the Prospect Analytics Server 102 and the Business Entity Analytics Server 104 as described herein.

In at least one of the various embodiments, Marketing Automation Platform Servers 108, can include one or more third-party and/or external marketing service Marketing Automation Platform Servers 108 can include, for example, one or more web or hosting servers providing marketing distribution platforms for marketing departments and organizations to more effectively market on multiple channels such as, for example, email, social media, websites, phone, mail, etc.) as well as automate repetitive tasks for, or the like. In at least one of the various embodiments, Prospect Analytics Server 102 can be arranged to integrate and/or communicate with Marketing Automation Platform 108 using API's or other communication interfaces provided by the services. For example, a Marketing Automation Platform Servers can offer a HTTP/REST based interface that enables Prospect Analytics Server 102 to output customer profiles and probability scores for prospects processed by the Prospect Analytics Server 102 and the Business Entity Analytics Server 104 as described herein.

In at least one of the various embodiments, files and/or interfaces served from and/or hosted on Prospect Analytics Servers, Business Entity Analytics Servers 104, CRM 406 Servers, and Marketing Automation Platform Servers 108 can be provided over network 204 to one or more client computers, such as, Client Computer 112, Client Computer 114, Client Computer 116, Client Computer 118, or the like.

Prospect Analytics Server 102 can be arranged to communicate directly or indirectly over network 204 to the client computers. This communication can include providing prospect outputs based on company win/loss databases provided by client users on client computers 112, 114, 116, 118. For example, the Prospect Analytics Server can obtain company win/loss event databases from client computers 112, 114, 116, 118 for AI machine learning training and classifier production as described herein. After processing, the Prospect Analytics Server 102 can communicate with client computers 112, 114, 116, 118 and output company profile data and prediction data as described herein.

In at least one of the various embodiments, Prospect Analytics Server 102 can employ the communications to and from CRM Servers 106 and Marketing Automation Platform Servers 108 or the like, to accept company win/loss databases from or on behalf of clients and output profile classifications and prospect predictions based on company win/loss databases. For example, a CRM can obtain or generate company win/loss event databases from client computers 112, 114, 116, 118, which are communicated to the Prospect Analytics Server 102 for AI machine learning training and classifier production as described herein. After processing, the Prospect Analytics Server 102 can communicate with CRM servers 106 and/or Marketing Automation Platform Servers and output company and company employee profile data and prediction data as described herein. In at least one of the various embodiments, Prospect Analytics Server 102 can be arranged to integrate and/or communicate with CRM server 106 or Marketing Automation Platform Servers 108 using API's or other communication interfaces. Accordingly, references to communications and interfaces with client users herein include communications with CRM Servers, Marketing Automation Platform Servers, or other platforms hosting and/or managing communications and services for client users.

One of ordinary skill in the art will appreciate that the architecture of system 400 is a non-limiting example that is illustrative of at least a portion of at least one of the various embodiments. As such, more or less components can be employed and/or arranged differently without departing from the scope of the innovations described herein. However, system 100 is sufficient for disclosing at least the innovations claimed herein.

Illustrative Operating Environment

FIG. 1B shows components of one embodiment of an environment in which embodiments of the innovations described herein may be practiced. Not all of the components may be required to practice the innovations, and variations in the arrangement and type of the components may be made without departing from the spirit or scope of the innovations.

FIG. 1B shows a network environment 200 adapted to support the present innovations. The exemplary environment 200 includes a network 204, and a plurality of computers, or computer systems 202 (a) . . . (n) (where "n" is any suitable number). Computers could include, for example one or more SQL servers. Computers 202 can also include wired and wireless systems. Data storage, processing, data transfer, and program operation can occur by the inter-operation of the components of network environment 200. For example, a component including a program in server 202(a) can be adapted and arranged to respond to data stored in server 202(b) and data input from server 202(c). This response may occur as a result of preprogrammed instructions and can occur without intervention of an operator.

The network 204 is, for example, any combination of linked computers, or processing devices, adapted to access, transfer and/or process data. The network 204 may be private Internet Protocol (IP) networks, as well as public IP networks, such as the Internet that can utilize World Wide Web (www) browsing functionality, or a combination of private networks and public networks.

Network 204 is configured to couple network computers with other computers and/or computing devices, through a wireless network. Network 204 is enabled to employ any form of computer readable media for communicating information from one electronic device to another. Also, network 204 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 204 may be configured to transport information of an Internet Protocol (IP). In essence, network 204 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

The computers 202 may be operatively connected to a network, via bi-directional communication channel, or interconnector, 206, which may be for example a serial bus such as IEEE 1394, or other wire or wireless transmission media. Examples of wireless transmission media include transmission between a modem (not shown), such as a cellular modem, utilizing a wireless communication protocol, or wireless service provider or a device utilizing a wireless application protocol and a wireless transceiver (not shown). The interconnector 204 may be used to feed, or provide data.

A wireless network may include any of a variety of wireless sub-networks that may further overlay stand-alone ad-hoc networks, and the like, to provide an infrastructure-oriented connection for computers 202. Such sub-networks may include mesh networks, Wireless LAN (WLAN) networks, cellular networks, and the like. In at least one embodiment, the system may include more than one wireless network. A wireless network may further include an autonomous system of terminals, gateways, routers, and the like connected by wireless radio links, and the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client computers, with various degrees of mobility. In one non-limiting example, wireless network may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, a wireless network may include virtually any wireless communication mechanism by which information may travel between a computer and another computer, network, and the like.

A computer 202(a) for the system can be adapted to access data, transmit data to, and receive data from, other computers 202 (b) . . . (n), via the network or network 204. The computers 202 typically utilize a network service provider, such as an Internet Service Provider (ISP) or Application Service Provider (ASP) (ISP and ASP are not shown) to access resources of the network.

The terms "operatively connected" and "operatively coupled," as used herein, mean that the elements so connected or coupled are adapted to transmit and/or receive data, or otherwise communicate. The transmission, reception or communication is between the particular elements, and may or may not include other intermediary elements. This connection/coupling may or may not involve additional transmission media, or components, and may be within a single module or device or between one or more remote modules or devices.

For example, a computer hosting a classifier builder may communicate to a computer hosting one or more classifier programs and/or event databases via local area networks, wide area networks, direct electronic or optical cable connections, dial-up telephone connections, or a shared network connection including the Internet using wire and wireless based systems.

Illustrative Network Computer

FIG. 2 shows an embodiment of a network computer configured overview for a system configured to employ Artificial Intelligence (AI) machine learning to generate company profiles and predictions based on win/loss classification of prospects. In at least one of the various embodiments, system 1 comprises a network computer 1 including a signal input/output, such as via a network interface 2, for receiving input such as an audio input, a processor 4, and memory 6, including program memory 10, all in communication with each other via a bus. In some embodiments, processor may include one or more central processing units. As illustrated in FIG. 2, network computer 1 also can communicate with the Internet, or some other communications network, via network interface unit 2, which is constructed for use with various communication protocols including the TCP/IP protocol. Network interface unit 2 is sometimes known as a transceiver, transceiving device, or network interface card (NIC). Network computer 1 also comprises input/output interface for communicating with external devices, such as a keyboard, or other input or output devices not shown. Input/output interface can utilize one or more communication technologies, such as USB, infrared, Bluetooth™, or the like.

Memory 6 generally includes RAM, ROM and one or more permanent mass storage devices, such as hard disk drive, tape drive, optical drive, and/or floppy disk drive. Memory 6 stores operating system for controlling the operation of network computer 1. Any general-purpose operating system may be employed. Basic input/output system (BIOS) is also provided for controlling the low-level operation of network computer 1. Memory 6 may include processor readable storage media 10. Processor readable storage media 10 may be referred to and/or include computer readable media, computer readable storage media, and/or processor readable storage device. Processor readable storage media 10 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 6 further includes one or more data storages 20, which can be utilized by network computer to store, among other things, applications and/or other data. For example, data storage 20 may also be employed to store information that describes various capabilities of network computer 1. The information may then be provided to another computer based on any of a variety of events, including being sent as part of a header during a communication, sent upon request, or the like. Data storage 20 may also be employed to store messages, web page content, or the like. At least a portion of the information may also be stored on another component of network computer, including, but not limited to processor readable storage media, hard disk drive, or other computer readable storage medias (not shown) within computer 1.

Data storage 20 can include a database, text, spreadsheet, folder, file, or the like, that can be configured to maintain and store user account identifiers, user profiles, email addresses, IM addresses, and/or other network addresses; or the like.

In at least one of the various embodiments, Data storage 20 can include databases, which can contain information determined from one or more events for one or more entities.

Data storage 20 can further include program code, data, algorithms, and the like, for use by a processor, such as processor 4 to execute and perform operations. In one embodiment, at least some of data store 20 might also be stored on another component of network computer 1, including, but not limited to processor-readable storage media, hard disk drive, or the like.

The system also includes data storage memory 20 including a number of data stores 21, 22, 23, 26, 304 which can be hosted in the same computer or hosted in a distributed network architecture. The system 1 includes a data store for a set of entity events 22. Entity event database 22 can include databases for companies as described herein, including company win/loss databases 301, training databases 306, 403, 503.

The system 1 further includes a classifier component including a classifier data store 23 comprising a set of company profile classifiers, as well as a company profile classifier model building program 14 for, when executed by the processor, mapping the set of entity events either previously provided and stored by the system or processed by an event logger 11 and stored in a database of entity events 22 to the company profile classifiers.

The system 1 further includes a prediction classifier model building component 13 including a prediction classifier data store 26 comprising a set of prediction classifiers, for, when executed by the processor, mapping the set of company data from databases processed by prediction classifiers and stored in the event database 22 to the set of prediction classifiers.

The system 1 includes a prediction engine 15. The prediction engine 15 can include a program or algorithm for, when executed by the processor, automatically predicting entity win/loss events from objective measures, i.e. observations and entity transactions logged or stored as entity events stored in the logging data store 21 and/or the entity data store 22 and classified as win/loss events by the prediction classifier 23.

Artificial Intelligence (AI) machine learning and processing, including AI machine learning classification can be based on any of a number of known machine learning algorithms, including classifiers such as the classifiers described herein (e.g., cluster, K-means cluster, decision tree, random forest decision tree, gradient boosted trees machine, propositional rule learner, linear regression, neural nets, support vector machines, etc.).

The system can also include a logging component including logging program 11 for, when executed by a processor, logging and storing data associated with the entity events. A logging data store 21 can store instances of entity events identified by the event logger 11 at the initial classifiers together with logging data for classifiers. Instances of entity events at these classifiers can be stored together with logging data including the name and version of the classifier(s) active, the classification for the entity, the time of the event, a prediction module's hypothesis of the event, the event data itself, the system's version and additional information about the system, the entity, and the event features.

The logging data store 21 can include data reporting predictions (e.g., probability scores) for entities when the events were recorded and the events themselves. Also, the prediction model, and event scores, the group classes of the for prediction models can be stored. Thus logging data can include data such as the classification status of an entity event, the prediction model employed, and model errors.

Data store 20 can also include a business entity information database 304 of robust company/business entity data 304 to map to and enrich company win/loss event databases 301 with company firmographic data from a firmographic database 31 as described herein. In at least one of the various embodiments, the firmographic data from the business entity information database 304 can include scores or other rankings for companies. In at least one of the various embodiments the business entity information database 304 can include one or more databases linked to business entity information, for example an employee database 37 including employee names and title or management code, a contact database 38 of contacts for employees of companies (e.g. email, mobile device IDs, phone), or a cookie database 35 of data compiled from cookies a business entity uses for digital tracking and digital campaigns. Data from database 304 can be mapped to companies using a mapping module 12. In at least one of the various embodiments, if the company name is not identified in the business entity database the system can be configured to generate an identifier and a generate one or more firmographic databases for the company. Non limiting examples of company entity data linking, generating firmographic databases and scoring for companies, and data integration by business entity information database 304 and business analytics server are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is incorporated by reference herein.

Event logger 11, classifier model building program 14, prediction classifier model building component 13, and prediction engine 15 can be arranged and configured to employ processes, or parts of processes, similar to those described in conjunction with FIGS. 3-6, to perform at least some of its actions.

Although FIG. 2 illustrates the system 1 as a single network computer, the invention is not so limited. For example, one or more functions of the network server computer 1 may be distributed across one or more distinct network computers. Moreover, the system 1 network server computer is not limited to a particular configuration. Thus, in one embodiment, network server computer may contain a plurality of network computers. In another embodiment, network server computer may contain a plurality of network computers that operate using a master/slave approach, where one of the plurality of network computers of network server computer is operative to manage and/or otherwise coordinate operations of the other network computers. In other embodiments, the network server computer may operate as a plurality of network computers arranged in a cluster architecture, a peer-to-peer architecture, and/or even within a cloud architecture. The system may be implemented on a general-purpose computer under the control of a software program and configured to include the technical innovations as described herein. Alternatively, the system 1 can be implemented on a network of general-purpose computers and including separate system components, each under the control of a separate software program, or on a system of interconnected parallel processors, the system 1 being configured to include the technical innovations as described herein. Thus, the embodiments not to be construed as being limited to a single environment, and other configurations, and architectures are also envisaged.

Generalized Operation

The operation of certain aspects of the various embodiments will now be described with respect to FIGS. 3-8. In at least one of the various embodiments, the system described in conjunction with FIGS. 3-8 may be implemented by and/or executed on a single network computer, such as network server computer 1 of FIG. 2 in communication with a client user computer or CRM Servers, Marketing Automation Platform Servers, or other platforms hosting and/or managing communications and services for client-users. In other embodiments, these processes or portions of these processes may be implemented by and/or executed on a plurality of network computers, such as network computers 202 (*a*) . . . (*n*) of FIG. 1B. However, embodiments are not so limited, and various combinations of network computers, client computers, virtual machines, or the like may be utilized. Further, in at least one of the various embodiments, the processes described in conjunction with FIGS. 3-8 can be operative in system with logical architectures such as those described in conjunction with these Figures.

Figure 3:
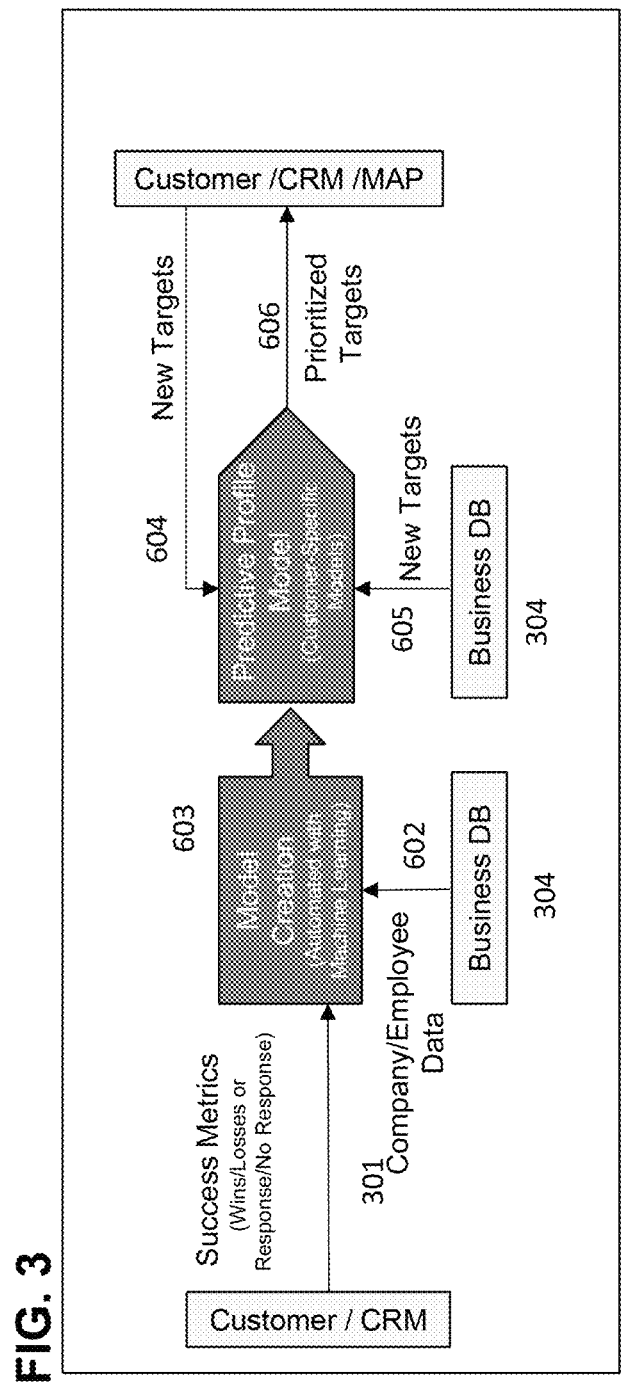
FIG. 3 illustrates a logical architecture of system and operational flowchart in accordance with at least one of the various embodiments.

FIG. 3 illustrates a high level logical architecture of a system and operational flowchart for a classifier engine in accordance with at least one of the various embodiments. In at least one of the various embodiments, at operation 601 the system accepts as input a company win/loss database 301 including a list of company engagements, and, for each engagement, a company name value, and a company address value into a classifier modeler configured train and output at least one classifier. The list can include further identification data for the company, and for example a company address value, a website, a phone number, an email address, and so on. In at least one of the various embodiments, the company win/loss database 301 can also comprise employee identifiers for employees and agents of the company, for example names, job titles, contact information (e.g., email, mobile identification, social network profile). The database 301 comprises, for each company, one or more success metrics for each company engagement, for example, wins/losses or response/no response. As described herein, positive event observations (e.g. customers, sales, marketing responses) for companies are described as "win" (W) engagements and negative event observations (e.g. lost sale, no response) as "loss" (L) engagements, however observations and events in the database can be logged or coded in any number of ways for purposes of training and classifier production, and are defined as wins and losses herein.

At operation 602 the system data from a business entity information database 304 is mapped to the company win/ loss database 301 and accepted into a classifier modeler. The system can be configured to map company entity data from the business entity information database 304 to each company from the company win/loss database 301. Where the company win loss database 301 includes employee identifier data, for example name data and employee title data, the system can be configured to map data from the business entity database to company the employee identifiers (e.g. map data to the names and/or titles).

For example, in at least one embodiment, the system can be configured to process the company list with data comprising firmographic data from the business entity information database 304. In at least one of the various embodiments, the firmographic data from the business entity information database can include scores or other rankings for companies or be configured to generate such scores or rankings in conjunction with a Business Entity Analytics Server 104. Examples of business entity scoring include a score for a company's past performance and a predictor of future performance.

In at least one of the embodiments, the system is configured to map the company identifier (e.g. name) to the company data in the business entity information database to compile a training database that includes the robust firmographic data mapped to the company win data and, if available, loss data. Where the company win loss database 301 includes employee identifiers such as name data and employee title data, the system can be configured to map data from the business entity database to company employee identifiers such as names and/or titles when compiling the training database. In at least one of the various embodiments, if the company name is not identified in the business entity database, the system can be configured to generate an identifier and a firmographic database for the company. Non limiting examples of company entity data mapping, generating firmographic databases and scoring for companies, and data integration by business entity information database 304 and business analytics server are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is incorporated by reference herein.

At operation 603, in at least one of the various embodiments, the classification engine's classification modeler is configured to identify a set of classifications for at least one classifier to identify one or more attractive classes and one or more unattractive classes. The classification engine can be configured to train the classifier on the training database from the data inputs from the company data from the client company win/loss database 301 and the business entity information database 304. The classification modeler can include a machine learning model builder such as, for example, a decision tree, a random forest decision tree, a cluster modeler, a K Means cluster modeler, Neural Nets, Gradient Boosted Trees machine, and Support Vector Machines (SVM).

Figure 7:
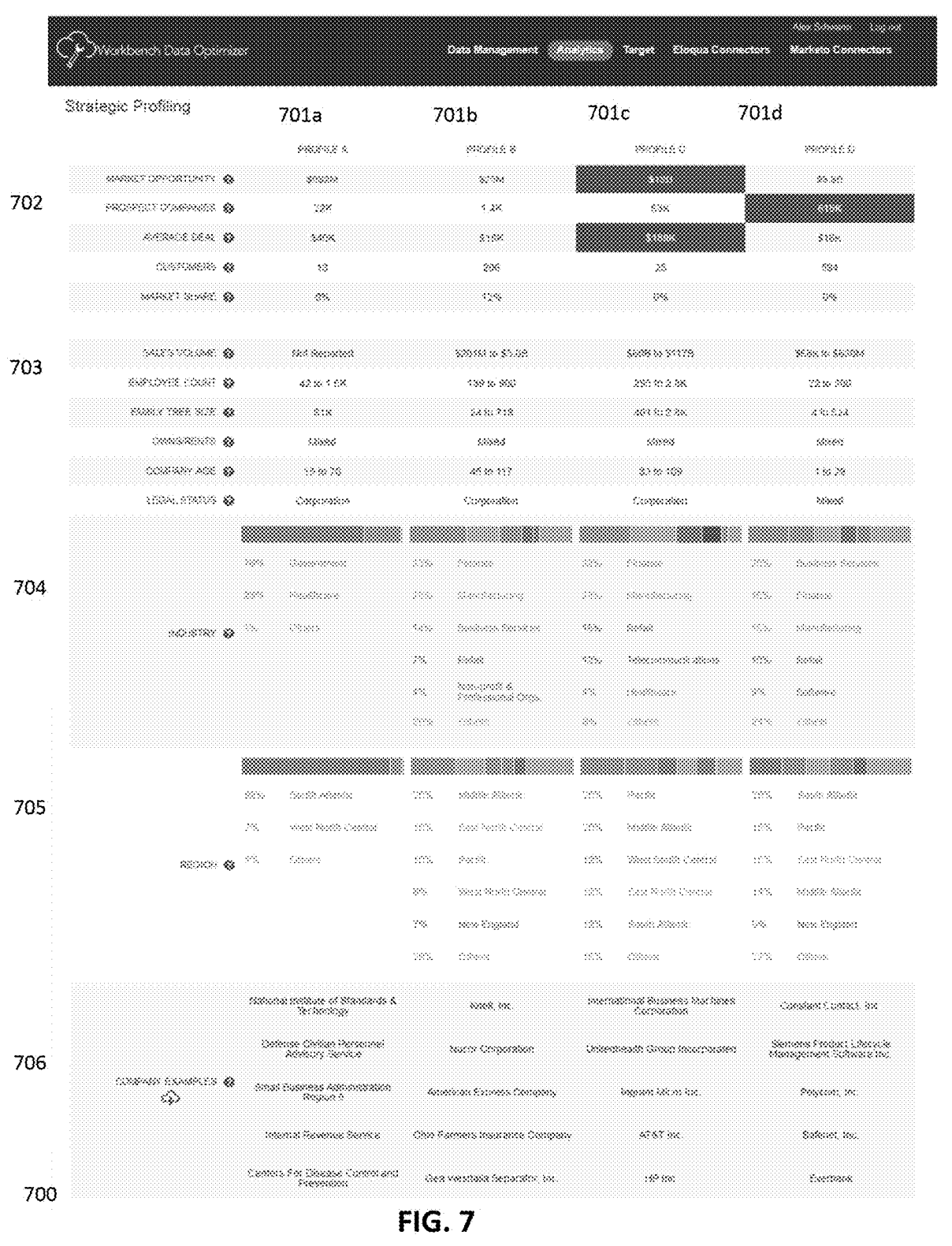

For example, in one embodiment, the classification engine trains a customer profile classifier on the training database 306 using K-means clustering as described herein. The classifier modeler then outputs the profile classifier trained on client "wins" to run on business entity database 304 to generate optimized company lists of targeted companies as described with respect to FIG. 4. For example, at operation 605 the system can be configured to run the company profile classifier on the business entity database 304 to classify companies into customer profiles and output the results to a user. At operation 604, the client user can access an interface as shown at FIG. 7 to identify new targets based on the individualized AI generated profiles classified by the company profile classifier as described with respect to FIG. 4.

For another example, in at least one embodiment, the classification engine trains a predictive classifier on the training database 306, 403, 503 using a decision tree classifier, for example random forest classifier. The classifier model builder then outputs the trained company predictive profile classifier to a prediction engine. The classifier modeler then outputs the predictive classifier trained on client "win" and "losses" to run on and prioritize prospect company lists. For example, in at least one of the various embodiments, the predictive classifier can be employed to prioritize companies separately classified by the company profile classifier as described with respect to FIG. 4. In at least one embodiment, the predictive classifier can be trained on data as described with respect to FIGS. 5A-5B and FIG. 6A and calculate probability scores for prospect lists, including prospect lists generated by the profile classifier and/or provided by a client user. In at least one embodiment, the predictive classifier can be trained on data as described with respect to FIG. 5B and FIG. 6B and calculate probability scores for prospect lists that include scores and employee data mapped from the business entity database 304 for employees of target companies, including prospect lists generated by the profile classifier and/or provided by a client user.

In at least one of the various embodiments, a prediction engine can be configured to identify and target prospects, for example, in one or more "win" profiles generated for the client user or via initial prospect lists provided by a client user. In an embodiment, a prediction engine can be configured to calculate a probability score for each company's classification. In at least one of the various embodiments, a prediction engine can be configured to calculate a probability score for company employee's classification where the classifier was trained on company employee data.

For example, a classifier engine can then be used to determine the probability of a new company to be a member of one or more of the defined company profiles for the classes or clusters. A predictive engine can then calculate a score which incorporates the probability of a company being within a defined cluster or class and the revenue associated with the class. For example, if a company is associated with a cluster or class that is a sales loss, then an estimated opportunity cost (or negative revenue) is applied. The score for a company is then the probability of the company being a member of the class or cluster multiplied by the revenue or opportunity cost associated with the class or cluster. Also, in an embodiment, the revenue per customer is used to further boost the attractiveness of the resulting class. Based on this classifier, a listing of one or more new companies can be processed to a corresponding set of firmographics, and the classifier can be used to assign each new company a probability in being in one or more classes. An associated attractiveness of the company can be determined based on the probability of being in the profile class and the attractiveness of the class.

Accordingly, in an embodiment, a prediction classifier is configured employ AI to identify and/or prioritize individualized prospects for a client user. For example, at operation 605 the system can be configured to run the company profile classifier on the business entity database 304 to classify companies and/or company employees and output the results to a user. For example, at operation 604, the client user can access an interface as shown at FIG. 7 to identify new targets based on the individualized AI generated profiles classified by the company profile classifier as described with respect to FIG. 4. The system can run a predictive engine including a prediction classifier trained on customer wins and losses, and at operation 606 provide a list of prioritized prospects.

In an embodiment, a client user can receive back the list of existing customers and or employees of customers the user sent, the associated revenue, and the sales losses along with a probability score for each for purposes of validation and model error checking. The client user can then validate that the model is performing as expected or if there was an error in the input data set, and provide model correction data. A cross-validation analysis can also be leveraged to confirm that the model operates as expected for a known set of data that was left out of the modeling process.

For example, a predictive classifier can be used to determine the probability of a company to be a member of one or more of the defined company profiles for the classes or clusters. The predictive classifier can then output a list of existing customers and/or employees of customers, associated revenues, sales losses, and a score for each. The client user can then select targets companies and/or employees identified with the predictive score as the highest likelihood to be in "win" classes.

For example, at operation 604 a client user can provide via an interface or other input a list of new prospects, for example, for sales or marketing. At operation 605 the classifier engine is configured to map the names provided by the client user to firmographic data from the company entity database 304 and run the predictive classifier to score the companies. At operation 606 the system then outputs the prioritized target list to the client user. to an output configured to output a list of classified, prioritized prospects. For example, the client user can receive an ordered set of 100 prospects based on the scores calculated. The system can be configured to offer options for list outputs, for example the top X percent of results, all companies meeting or exceeding a probability score threshold (e.g.: over 0.7), or other configurations.

In an embodiment, the system is configured to accept client user constraints on an input for accepting one or more constraints on classifier results. Examples of reasons for constraining results include legal or logistical constraints. A set of constraints could be, for example, logistical and sales coverage related issues (for instance only companies based in California if the product, sales, support, or services are only available in this region); or exclude non-US entities (if, for instance, the company is not equipped to handle contracts outside of the US or in a specific region).

At operation 606, the predictive classifier is configured to run the classifier with the constraints and the additional information and to output a list of classified, prioritized prospects. For example, the client user can receive an ordered set of 100 prospects based on the score calculated and the constraints provided.

Figure 4:
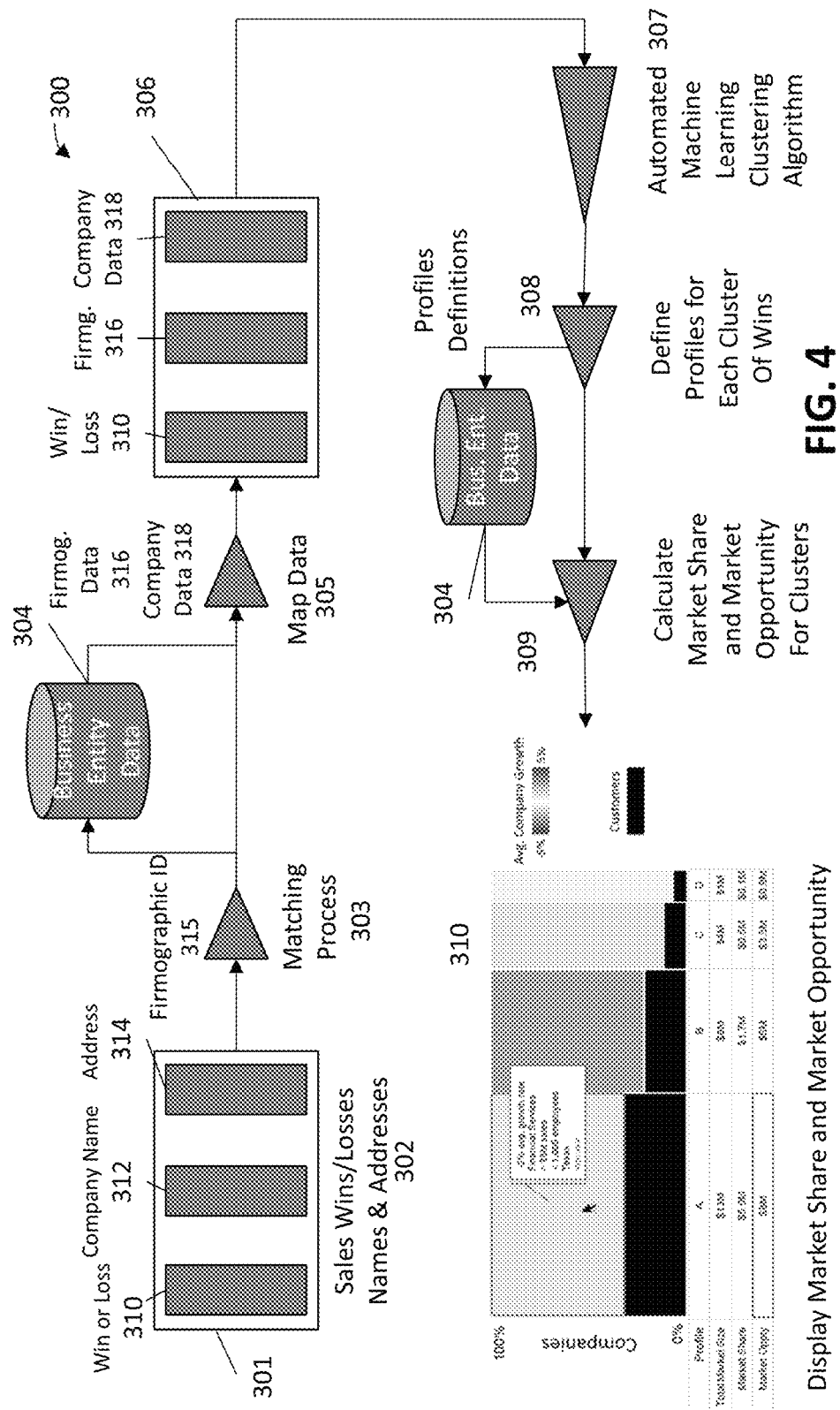
FIG. 4 illustrates a logical architecture of a system and operational flowchart in accordance with at least one of the various embodiments.

FIG. 4 illustrates a logical architecture of system and system flow 300 for AI predictive analytics for company profile and prospect generation in accordance with at least one of the various embodiments.

In at least one of the various embodiments, at operation 302, the system accepts as input a company win/loss database 301 including a list of win or loss company engagements 310, and, for each engagement, a company identifier, for example a company name 312. The list can include further identification data for the company, for example a company address 314, a website, a phone number, an email address, and so on. In at least one of the various embodiments, the company win/loss database 301 can also comprise identifiers for employees and agents of the company, for example names, job titles, contact information (e.g., email, mobile id, social network profile). The database 301 can comprise for each company, a win engagement (W) value and/or a loss engagement (L) value along with an associated characteristic of the engagement, for example, Product A sales or a marketing engagement channel (e.g., email, text, social media profile).

In an embodiment, the list of won company engagements 310 comprises a simple customer list or sales report, sales being a success metric the system can identify as a win. In an embodiment, the won company engagement can include for one or more engagements a begin time value, and, if available, a customer revenue value. For example, in an embodiment, a user can provide a list of existing customers as won engagements, and when they became a customer for a begin time value. If available, the user can provide the yearly revenue received per customer. In an embodiment, company engagement wins comprise a response to a marketing engagement, a sale of a product or service, a positive return on investment (ROI).

A client user can also provide list of lost company engagements 310. In an embodiment the list can comprise for each lost company engagement 310, if available, a when lost value, and a why lost value. For example, the user can provide, if available, a list of sales engagements that were lost and when they were lost. If there are further classifications as why the deal was lost, such as to a competitor or due to lack of ROI, then this can be provided as well. For example, a user can provide list of sales engagements that were lost is also provided and when they were lost and a code as to why the deal was lost such as "N" for a no product purchased and/or "C" for a competitive product purchased. Examples of lost company engagements 310 can include any number of values, for example, a non-response to a marketing engagement, a lost sale of a product or service, loss of ROI, and so on.

As will be appreciated, the same company may have multiple and overlapping win and loss values. For example, a company may be identified as a customer, thus a won engagement (W), but may also be identified as having refused to purchase a given product or service (e.g. an upsell or cross-sell), or did not respond to a marketing engagement, thus also have a lost engagement (L) value. Accordingly, a classifier can train to identify different classes, and a given company may be classified as a win for some classes and a loss for others, each class having a discrete win values and a discrete loss values for the class. Thus each company will have either a win or a loss value for given class. As described herein, similar companies (e.g. companies with similar firmographics) may be classified as wins or losses in the same class. Also, in at least one of the various embodiments, the win and/or loss values are determined by the system. For example, a client user may provide a list of sales to identified companies. The system can be configured to identify sales as win (W) values and log the sale event as a win linked to the company name.

In at least one embodiment, at operation 303, the system can be configured to link company entity data for each company identified in the win/loss database 301. For example, in at least one embodiment, the system can be configured to process the company list to identify or generate a firmographic company ID and match each company with data comprising firmographic data 316 and company data 318 from a business entity information database 304, as well as generate a score to rate, for example, each companies past performance and a predictor of future performance. Examples of company entity data linking, data integration and a business entity information database 304 of quality assured firmographic data are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is incorporated by reference herein.

In at least one embodiment, at operation 305 the linked company win/loss database 301 data 310, 312, 314 and company entity data 316, 318 from company entity database 304 are compiled into a training database 306. In an embodiment, the database includes, for each company, one or more win/loss values 310, firmographic and score data 316, and company data 318. The training database 306 is compiled to train a machine learning AI customer profile classifiers as described herein. The training database 306 includes data used for modeling that leverages robust firmographics data 316 from the business entity information database 304 that is available, for example, from a begin time value for each company, for example the time when the company became a customer or when the sale was lost. Company data 318 and firmographic data 316 for each company can include, without limitation, revenue range, industry, geographic locations and coverage, own/rent, location type (subsidiary, headquarters, sole location), sales volume, employee count, corporate structure, company age, legal status, SIC code data, and a host of other categories. These characteristics can be used for creating the classifications as described below can be based on firmographics and related data of the company state, e.g., when a loss or win took place. Included in this data is information such as financial stability and growth related information, such as a score to rate, for example, each companies past performance and a predictor of future performance (including the likelihood for the company to stay in business over a twelve month time period or the likelihood of the company to grow or shrink significantly in a specified time frame), for example as determined by the AI expert systems described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is incorporated by reference herein.

In at least one of the various embodiments, at operation 307 a classification engine model builder can be configured to identify a set of classifications for at least one classifier, for example a company profile classifier or prediction classifier. In at least one of the various embodiments, the classification engine can be configured to identify one or more attractive classes based and one or more unattractive classes. The classification engine can be configured to train on at least one classifier on the firmographic enhanced training data in the training database 306. The classification engine can include a machine learning model builder can be, for example, a decision tree, a random forest decision tree, a cluster modeler, a K Means Cluster modeler, Neural Nets, Gradient Boosted Trees machine, and Support Vector Machines (SVM).

Company Profile Builder

For example, in one embodiment, the classification engine trains a customer profile classifier on the training database 306 using a cluster modeler. For example, in at least one embodiment, the system includes a K-means clustering modeler, for example, k-mean clustering, K-modes clustering, or k-means++ algorithms. A K-means clustering solution is typically defined as $\Sigma_{j=1}^{K}\Sigma_{x_i \in j}(x_i - \mu_j)^2$, which minimizes the sum of the squares of the differences between x_i, the i^th vector of observations belonging to the j^th cluster, and the cluster centroid, $\mu$_j for each cluster j in the set of K clusters.

In an embodiment, the classification engine modeler is configured to associate firmographic data 316 with the company win/loss data 310 to identify the profile classifications. In at least one of the various embodiments, where the win company engagement data 310 is customer engagement, the classification engine includes a weight parameter configured to prefer more recent customers for the attractive classification. For example, during the clustering, model process weights are applied such that older customers are less relevant compared to newer customers. In another example, the age (begin time) of the win or loss reduces the weight of this data in the classification model. That is, a customer (W) from five years ago (begin time) will have less impact on a classification profile model as a customer that was acquired last year. In an embodiment, the classification engine includes a weight parameter configured to prefer higher expected revenue per customer for an attractive classification. In an embodiment, the classifier is configured to train on firmographic data and loss company engagement data, for example training on firmographic data from when a company engagement was lost (when lost). In an embodiment, a why lost classifier includes a lack of funding class, an ROI class, and a competitor class.

In an embodiment, the classifications can include an undefined class, which corresponds to companies which are significantly different from other companies in the data set.

This allows a company to also have a probability to be unassociated with any of the classes that have been identified. Such undefined classifications can indicate companies with sufficiently distinct firmographics that outline a new profile (e.g. a new business model or a "disruptor"). In an embodiment, portions of the firmographics may not be available for a specific company. For example, the system can be configured to parametrize a set of defined criteria for each type of information element used in the modeling process and, if the data is incomplete or required, the company is not included in the modeling process. In another embodiment, the information element can be an element that can be averaged based on other criteria available in the model and filled in with this estimated value.

In an embodiment, a company may exhibit slightly altered characteristics that qualify them as "attractive" or "unattractive" based on, for example, maturity, geographic expanse, or depth of data available. Segmenting them on the basis of these and other characteristics that may later be defined can provide a more robust classification In at least one of the various embodiments, at operation 308, the classification engine is configured to identify and generate profile classifications for firmographics 316 associated clusters of wins (W) as described above, and the company data 318, which can include company metrics, including company state data. For example, as described above, the classification engine can identify classes by training on firmographics data 316 and company metrics 318 associated with the growth rate and financial sate of the company (e.g.: the likelihood for the company to stay in business over a twelve month time period or the likelihood of the company to grow or shrink significantly in a specified time frame), for example as determined by the AI expert systems described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is incorporated by reference herein.

The classifier engine outputs a profile classifier including defined profiles for each cluster of wins as a company profile, which can then be run on the company entity database 304 to classify other companies in the database 304 that fit the respective profiles. At operation 309, the profile classifier is configured to classify other companies into profile classes and calculate, inter alia, market share and market opportunity for the profiles. In an embodiment, customer profile classifications comprise classes for market opportunity, a number of prospect companies, an average sale/deal, and a client user's market share. The classifier thus identifies and can generate list of companies firmographically similar to those sold or marketed to the past and grouped by profile characteristics trained on the client user's own data. Such lists can be generated in seconds using the trained classifier and can include from thousands to tens of thousands of companies as well as associated people and their contact information, per profile, all being AI qualified prospects. At operation 310, the system is configured to output the customer profiles and profile data for a client user, for example to a client user interface as shown in FIG. 7, or can be provided via other outputs (e.g., a prospect database or report).

Figure 5A:
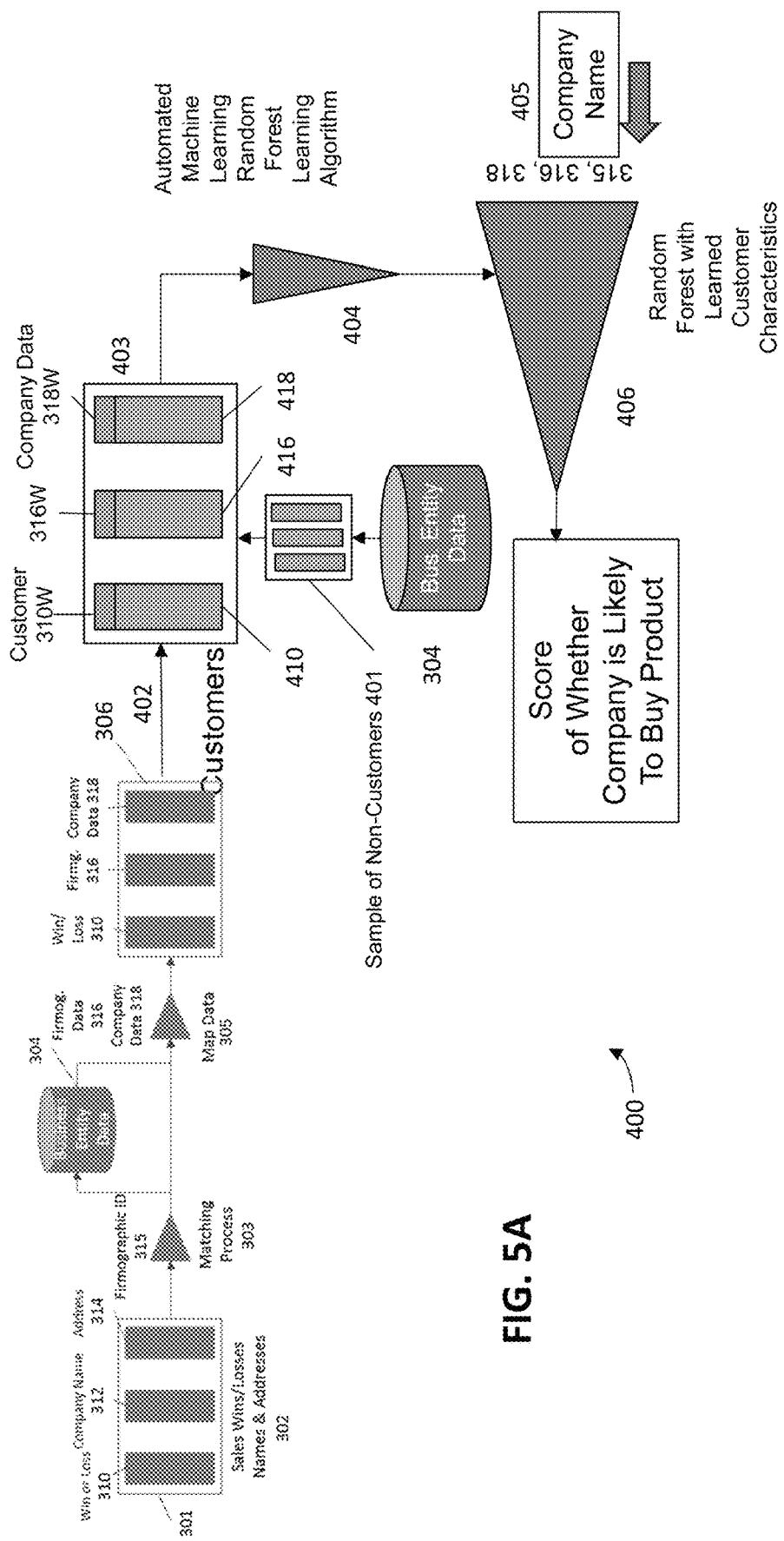
FIGS. 5A to 5C illustrate a logical architecture of a system and operational flowcharts in accordance with at least one of the various embodiments.
Figure 5B:
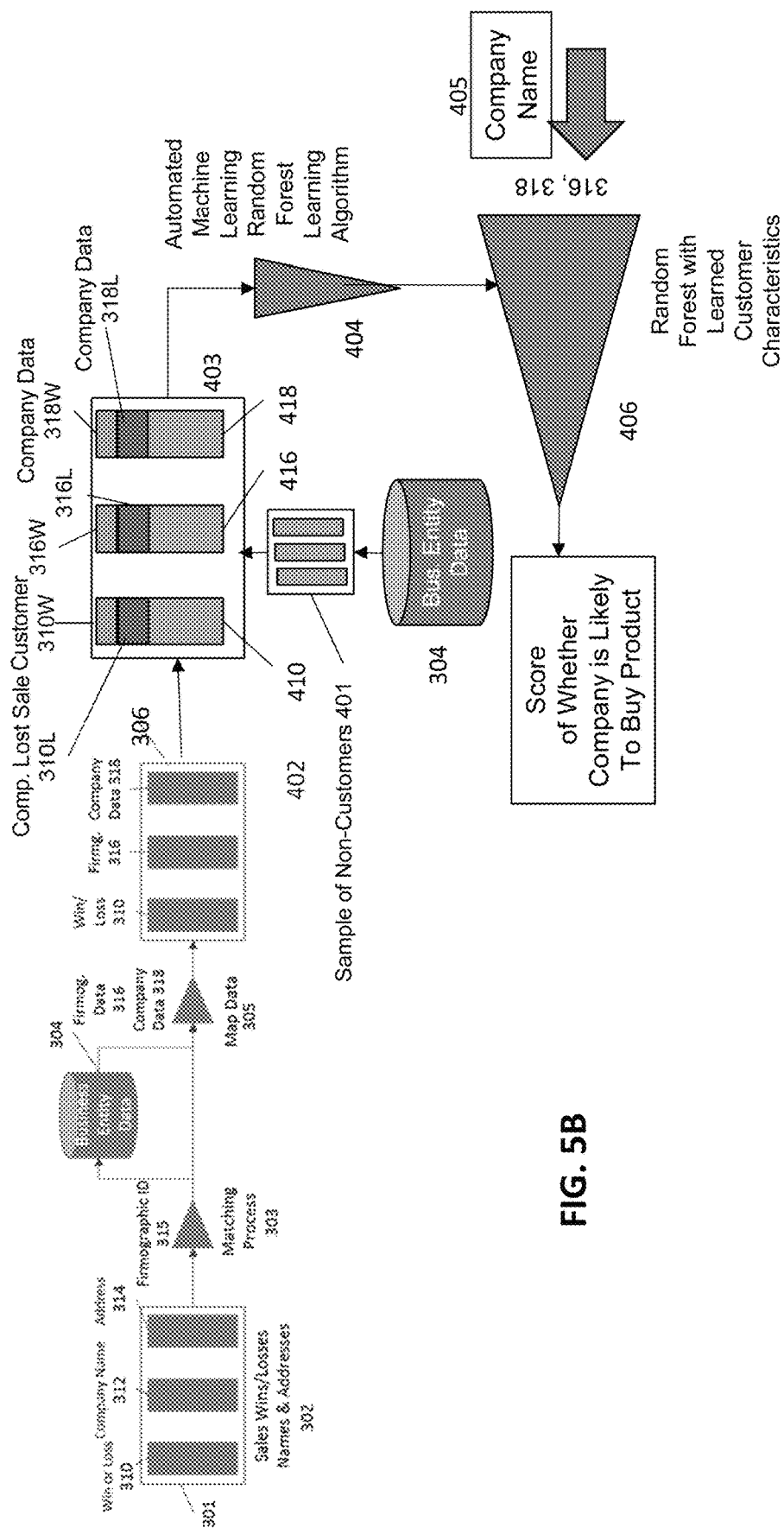
Figure 5C:
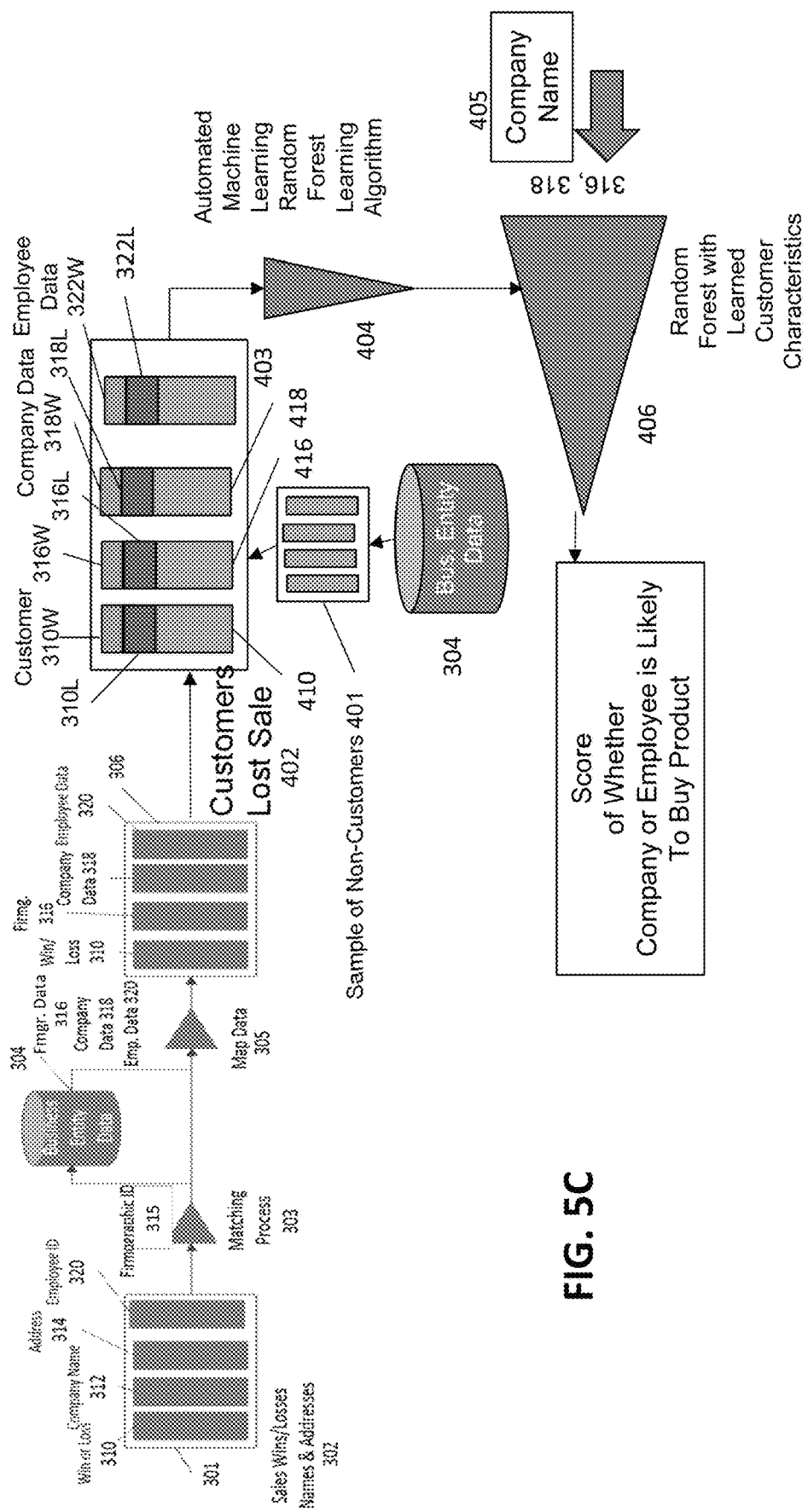

FIGS. 5A-5B illustrate a logical architecture of system and system flow 400 for AI predictive analytics for targeted classification and scoring the likelihood of companies' purchasing a client user's products or services in accordance with at least one of the various embodiments. FIG. 5C illustrates a logical architecture of system and system flow 400 for AI predictive analytics for targeted classification and scoring the likelihood of companies and employees at companies purchasing a client user's products or services in accordance with at least one of the various embodiments. As shown in FIG. 5C, the company win loss database 301 includes employee identification data 320, for example, employee name data and employee title data, with company identification data 312, 314.

In at least one embodiment, the system carries out operations 302-305 as described above, and at operation 305 the company win or loss database 301 data 310 mapped to company entity data 318 and firmographic data 316 from company entity database 304 are compiled into a training database 306. In an embodiment, as shown in FIGS. 5A-5B, the training database 306 includes, for each company, one or more win/loss values 310, firmographic and rating score data 316, and company data 318 as described above. As shown in FIG. 5C, at operation 305 the system maps the data from the business entity database 304 to employee data 322 when compiling the training database 306.

At operation 402, the system is configured to access a sample of non-customer data 410 from the company entity database 304, and compile the training database 403 to also include non-customer data 401, such that training database 403 includes training data comprising a company list of customer sales as win data 301W. As shown in FIG. 5B the customer database can also include loss data 310L, for example lost sales, which can be included in the training database 403. The system can compile training database 403 to map the sample of non-customer win/loss sale data 410, firmographic and scoring data 416 for each company, and company data 418 to the respective customer databases 310W, 316W, 318W and, if available, loss databases 310L, 316L, 318L as shown in FIG. 5B. As shown in FIG. 5C, the training database 403 also can include employee data 422 from the non-customer sample mapped to customer/lost sale company employee data 322.

At operation 404, in at least one embodiment, the classification engine trains and outputs a classification model configured to identify a set of "attractive" classes that correspond to characteristics of the existing customers and/or employees thereof and a set of "unattractive" classes that are defined by the characteristics of sales losses. In an embodiment, a machine learning classifier such as a decision tree such as random forest modeling technique can iterate on multiple models to capture many features of the data set and to avoid overfitting. The predictive classifier builder builds classifiers configured to classify sale wins (W) and, if provided, lost sale losses (L) trained on robust firmographics 316,416 and company data 318,418.

In an embodiment, a prediction engine can be configured to calculate a probability score for each company's classification and/or company employee's classification. In an embodiment, the prediction engine can be configured to calculate a sale revenue associated with the class. If the class includes a sales loss, then the revenue is a negative revenue representing an estimated opportunity cost. In an embodiment, a probability weighted score can be calculated as the probability of a company and/or employee being a member of the class multiplied by the revenue value, wherein the probability score is calculated separately for each product or service the user sells. In at least one embodiment, the classification engine outputs a classification model configured to identify a set of "attractive" classes or clusters that correspond to characteristics of the existing customers and/or employees thereof and a set of "unattractive" classes or clusters that are defined by the characteristics of sales losses. As noted above, in an embodiment, a machine learning classifier such as a decision tree such as random forest modeling technique can iterate on multiple models to capture many features of the data set and to avoid overfitting.

For example, the resulting classifier can then be used to determine the probability of a new company or employee of a company to being a member of one or more of defined company profiles for the classes. A score can then be calculated which incorporates the probability of a company or employee of a company being within a defined class for purchasing a product. In an embodiment, the revenue can be associated with the class. In an embodiment, the customer classifications include firmographic data, the firmographic data comprising, but not limited to, a sales volume, industry, own/rent, headquarters, employee count, family tree size (e.g. a total count of domestic and global entities, headquarters, branches, etc.), company age, and legal status.

Also, in an embodiment, the revenue per customer can be used to further boost the attractiveness of the resulting class. Based on this classifier, a new company and a corresponding set of firmographics and related data can be used to assign this company to a probability in being in one or more classes and an associated attractiveness of the company can be determined based on the probability of being in the profile class and the attractiveness of the class.

In an embodiment, the classification of a loss may overlap with a win. For example, a classifier may classify an overlapping win value and loss value, for example a customer engagement or sale (W) and a lost sale (L) for similar companies (e.g.: in the same industry or with other similar firmographics). This can indicate that there is a competitor that is operating in this space and will thus reduce the "attractiveness" of the classification as well as result lower a probability purchase score.

The probability score for a purchase can be determined and weighted by firmographic classes tied to classifiers trained on customer wins and losses and non-customer firmographics. In an embodiment, customer profile classifications comprise, for example, classes for market opportunity, a number of prospect companies, an average sale/deal, and a user's market share. The AI machine learning is configured to train the classifier to assign different products and different services their own class.

At operation 404 the classifier engine outputs the trained classifier with learned customer characteristics to a prediction engine. At operation 405 the prediction engine accepts as an input a database or file of company names. In at least one embodiment, the system can be configured to link the company list identifying each company (e.g. company name, email address, web address, phone) with data comprising firmographic data, for example, quality assured firmographic data from a business entity information database 304 as described herein. Once the new customer database is enriched with firmographic data, at operation 406 the prediction engine is configured to employ the trained classifier to calculate a probability score for companies from the database of company names 405 likely to purchase a given product or a given service.

Figure 6A:
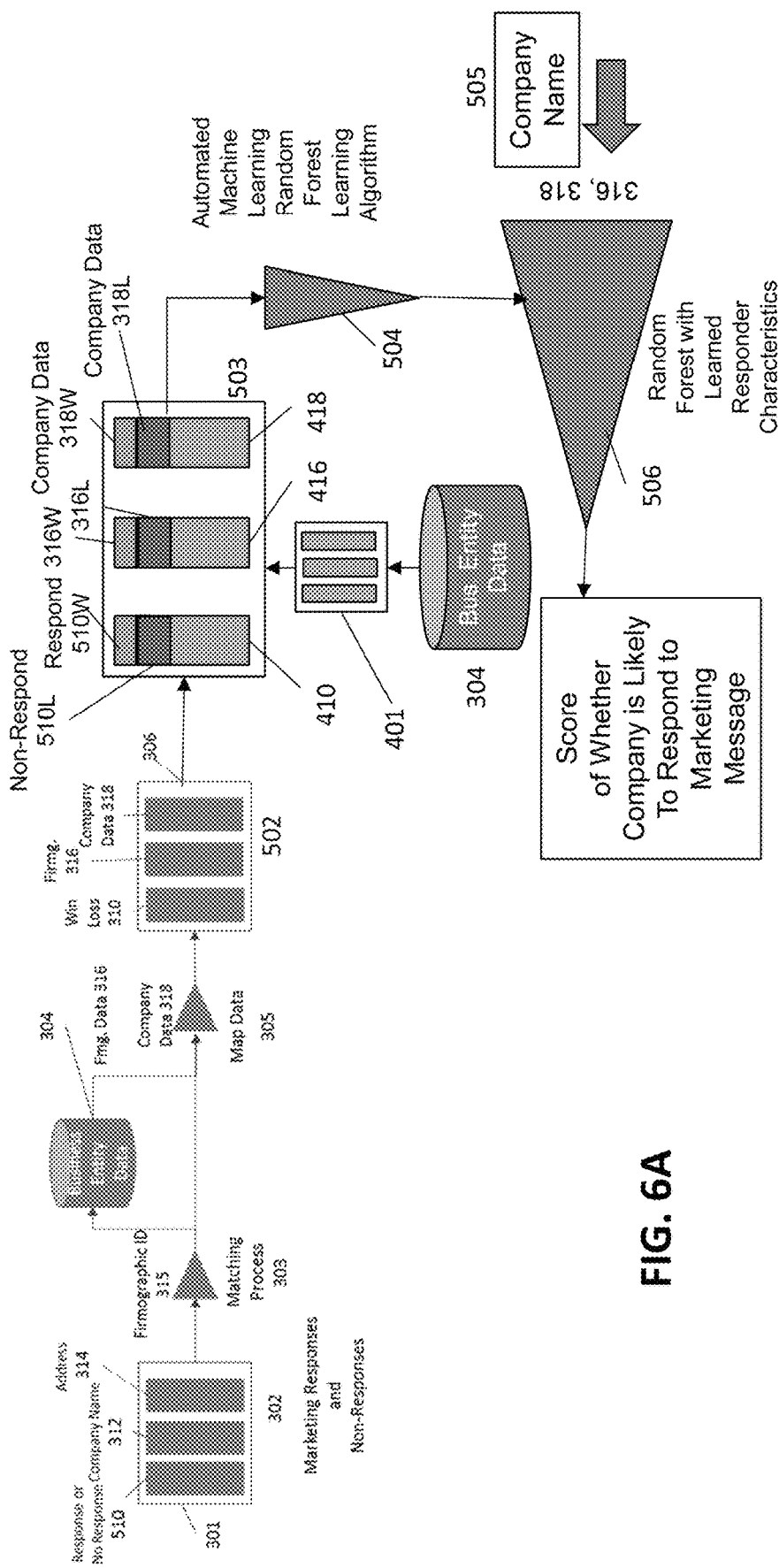
FIGS. 6A and 6B illustrate a logical architecture of a system and operational flowchart in accordance with at least one of the various embodiments.
Figure 6B:
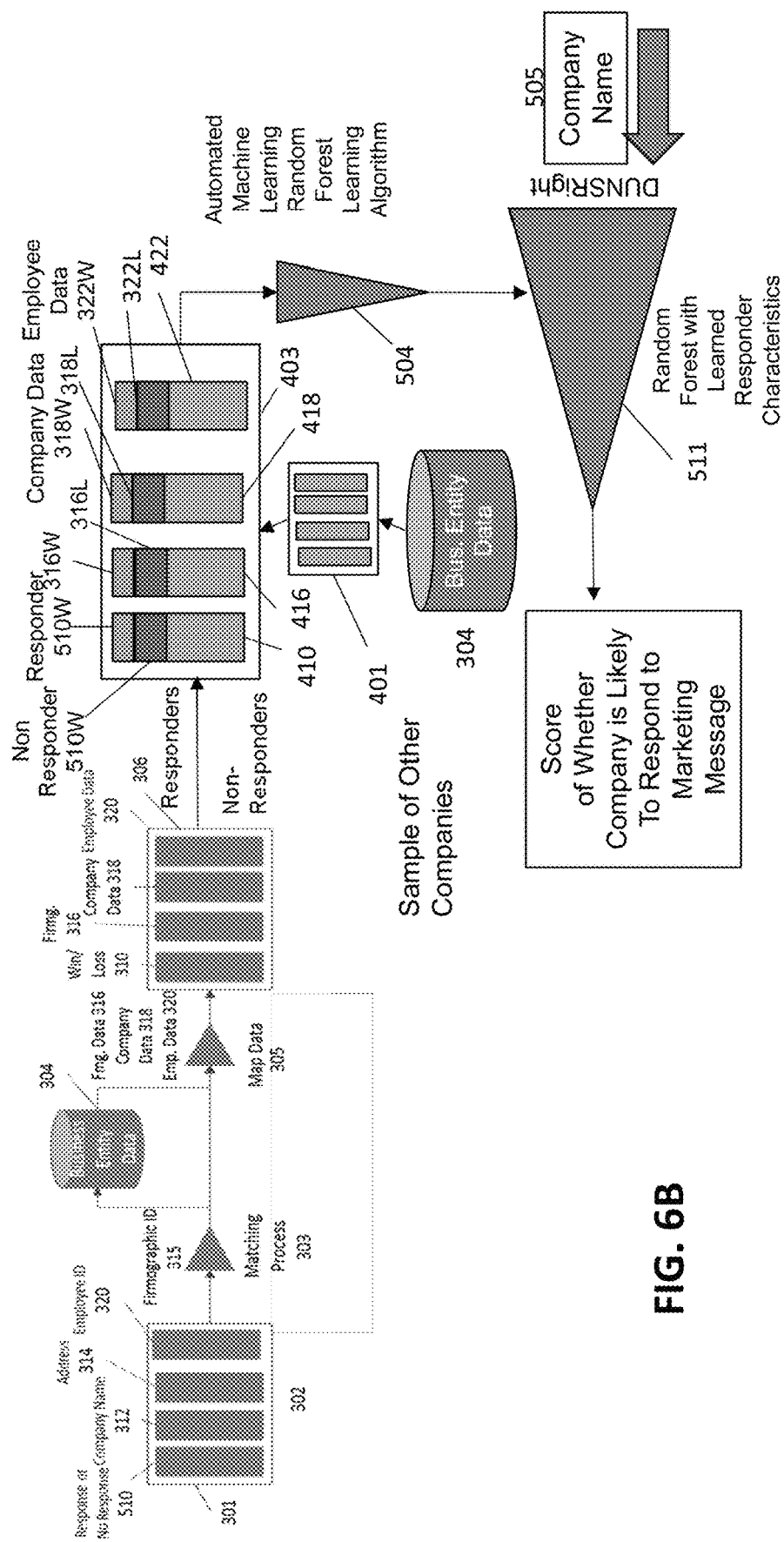

FIGS. 6A and 6B illustrates a logical architecture of system and system flow 500 for AI predictive analytics for targeted classification and scoring the likelihood of companies' and/or company employees responding to marketing messages in accordance with at least one of the various embodiments.

In at least one of the various embodiments, at operation 302, the system accepts as input a company win/loss database 301 including a list of company engagements 510, and, for each engagement, a company name value 312, and a company address value 314. As shown in FIG. 6B, in at least one of the various embodiments, the list 301 can include a list of company employee names and titles. The database 301 comprises, for each company and/or company employee, a response win engagement (W) value 510W. The database 301 can also include a no response engagement (L) 510L value.

In an embodiment, the list of won company engagements 510W comprises a marketing response. In an embodiment, the won company engagement can include for each engagement a time value, for example, in an embodiment, when the company and/or company employee was sent a marketing message and when a response was received. The user can also provide list of lost company engagements 510W. In an embodiment the list can comprise for each lost company engagement 510W, if available, a when lost value, and a why lost value. For example, the user can provide, if available, when the marketing message was sent and, if available, why there was no response (e.g. message channel no longer available).

In at least one embodiment, at operation 303, the system can be configured to link company entity data to each company from the company win/loss database 301. For example, in at least one embodiment, the system can be configured to process the company list identifying each company (e.g. company name 312, address 314, email address, web address, phone) and/or each company employee 320 (e.g., employee name, employee title) to identify or generate a firmographic company ID 315 and match each company with data comprising, for example, quality assured firmographic data 316 and company data 318 from a business entity information database 304, as well as generate a score to rate, for example, each company's past performance and a predictor of future performance. Examples of company entity data linking, data integration and a business entity information database 304 are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, the entirety of each of which is described herein.

In at least one embodiment, at operation 305 the company response/non-response data 510 from database 301 is mapped via a company firmographic ID 315 to company entity data from company entity database 304 and compiled into a training database 306. In an embodiment, the training database 306 includes, for each company and/or company employee, one or more win/loss values 510, robust firmographic and rating score data 316, and company data 318.

At operation 502 the system is configured to access a sample of other company data 401 from the company entity database 304, and compile a training database 503, including training data comprising a company list of responders 510W and non-responders 510L, firmographic and scoring data 316, and company data 318 enriched by other non-customer company data 410, 416, 418, 422 by the sample. As shown in FIG. 6B the company database 301 can also include loss data 510L, for example non-response data 510L, which can be included in the training database 503. The system can compile training database 503 to map the sample of other company win/loss sale data 410, firmographic and scoring data 416 for each company, and company data 418 to the respective company databases 510W, 316W, 318W and, if available, loss databases 510L, 316L, 318L. As shown in FIG. 6B, the training database 503 also can include employee data 422 from the non-customer/other company sample mapped to response/non-response company employee data 322.

At operation 509, in at least one embodiment, the classification engine trains and outputs a classification model configured to identify a set of "attractive" classes or clusters that correspond to characteristics of the existing customers and a set of "unattractive" classes or clusters that are defined by the characteristics of company responses (W company engagements) and non-responses (L company engagements) to marketing messages. In an embodiment, a machine learning classifier such as a decision tree such as a random forest modeling technique can iterate on multiple models to capture many features of the data set and to avoid overfitting. In an embodiment, the classification of a loss may overlap with a win. For example, a classifier may classify an overlapping win value and loss value, for example a response (W) and non-response (L) on a specific marketing channel (e.g. email) for similar companies (e.g.: in the same industry or with other similar firmographics). This can indicate that the message channel does not consistently engage customer response and will thus reduce the "attractiveness" of the classification as well as result in a lower a probability response score. For another example, a company may send a marketing message by one channel (e.g. email) with no response (L) and the same message by another channel (e.g. text) with get a response (W). This will increase the "attractiveness" of the text channel and decrease the attractiveness of the email channel for that particular kind of marketing message. Accordingly, the probability score for a message response can be determined and weighted by firmographic data and messaging classes tied to classifiers trained on client provided response wins and losses and non-customer/other company firmographics and messaging. The AI machine learning is configured to train the classifier to identify and assign different classes, for example for different channels and message types their own class, and generate scores as described herein. The classifier engine outputs the trained classifier with learned responder characteristics to a prediction engine.

At operation 505 the prediction engine accepts as an input a database or file of company names. In at least one embodiment, the system can be configured to map the company list identifying each company (e.g. company name, email address, web address, phone) with data comprising firmographic data, for example, quality assured firmographic data from a business entity information database 304 as described herein. Once the new customer database is enriched with firmographic data, at operation 506 the prediction engine is configured to employ the trained classifier to calculate a probability score for companies likely to respond to a message and by what channels.

In at least one of the various embodiments, the system can be configured to map the company list identifying each company employee (e.g. company name, email address, web address, phone) with employee data (e.g. name, email, cookie data) from the business entity information database 304 as described herein. For example, as shown in FIG. 6B, the system can access employee data in at least one of the contact database 33, cookie database, or employee database 37 of the business entity information database 304 and map the data to the company list. Once the new customer database is enriched with firmographic data as well as the employee data, at operation 511 the prediction engine is configured to employ the trained classifier to calculate a probability score for company employees and/or employee positions (e.g., management code, title) likely to respond to a message and by what channels. The system can also be configured to provide, for scored employees, one or more channels for contacting the employee, for example, email, digital media channels (e.g. from cookie tracking data), mobile and text.

FIG. 7 shows an exemplary profiling interface 700 for at least one of the various embodiments. The system is configured to allow a client user to provide a list of companies and addresses and win/loss data as described above on which the system trains a company profile classifier, for example using a K-Means clustering component. The system then runs the classifier on data from a company entity database of robust firmographic data to produce a plurality of profiles 701a, 701b, 701c, 701d produced from "win" classes. Each profile 701a, 701b, 701c, 701d includes profile classifications 702 for: market opportunity, number of prospect companies, average sale/deal, and the client user's market share. The interface 700 thus allows the client user to identify the win based profiles trained on the client user's own customers, weighted for highest probability of success, with the best market opportunity, highest average deal per customer, and the client users market share within each profile.

The profile classifications also include company and firmographic classifications 703. As shown FIG. 7, the firmographic classifications 703 can comprise: revenue range/sales volume, employee count, family tree size, company age, and legal status. The system interface 700 can also be configured to present firmographic classification information to identify profile characteristics that can be used to target prospects and messaging (e.g., market messaging) and other strategic goals, for example industry 704 (e.g., type and percentage) and region 705 (e.g. region coverage and percentage). Other firmographic classification information can be provided as well, for example SIC coded information, viability information, drill-down firmographics within classifications, and so on without limitation. The interface 700 can also be configured to display a list of company examples 706 falling within each profile, which the client user can download.

Each profile 701a, 701b, 701c, 701d can include thousands to tens of thousands of profiled companies. Thus in at least one of the embodiments, the system can include a predictive engine including a predictive classifier trained on a win/loss database provided by the client user as described herein, for example a random forest decision tree module. In at least one of the embodiments, the system interface 700 can be configured to allow the user to select a profile to be presented with a list of prospects. The system can be configured to classify the prospect companies in each profile using the predictive classifier and score the probability of success for each company within the profile. The system can then output a prioritized set of companies based on probability scores as described herein, for example, an ordered set of 100 prospects based on the scores calculated. The system interface 700 can be configured to allow the user to select from results from firmographic data to select a target from within the profile, for example to narrow results or to be presented with further information. The interface 700 can also be configured to allow a user to accept one or more constraints on classifier results, for example, logistical constraints or legal constraints. Following this, the classification model takes the constraints and the additional information and output a prioritized set of companies based on probability scores as described herein, for example, an ordered set of 100 prospects based on the score calculated and the constraints provided.

Figure 8:
FIG. 8 illustrates and exemplary client user interface showing scored prospects.

FIG. 8 illustrates an embodiment of an interface 800 configured to allow a client user to search, profile and obtain prioritized lists of scored prospects. The interface includes a Search object 801 configured to allow a user to initiate a search of scored prospect companies or employees. The search can be performed categories, for example firmographic categories such as industry or region. The interface 800 also includes a Profile search object 802 where the user can employ drop down menus to select a sub-category 803 (e.g. Site, Domestic, Global) and select search operators 804 (e.g., "is Primarily" "Includes," "Excludes") as well as a sub-category field 806 to select and define one or more sub-categories (e.g. industry sectors, sales range, employee count, legal status, employee title) for the company or company personnel profile). The Profile Search object 802 also includes an Include Unknown object 805 for including companies in the results for the search parameters and filters are unknown. The interface 800 comprises a Prospect Score area 808 configured to allow the user to receive and prioritize predictive scores. The Prospect Score area 808 includes drop down filters for Filter by 809, Filter 810 (e.g. Product, email response rate, marketing response), and Result 811 (e.g. % of Highest Scored Records, companies meeting or exceeding a probability score threshold, a count threshold). The Prospect Score area 808 includes a graph 812, shown as a bar graph, displaying the scoring results for the companies. The interface 800 is configured to allow the client user to save the Profile of prioritized prospects via a Save Profile object 814. The interface also includes a Clear Search 815 object configured to allow the user to clear the search results of scored prospects. In an embodiment, the system interface includes Save Profiles object 816 to access saved profiles.

It will be understood that each operation of the flowchart illustration, and combinations of operations in the flowchart illustration, can be implemented by computer program instructions. These program instructions may be provided to a processor to produce a machine, such that the instructions, which execute on the processor, create means for implementing the actions specified in the flowchart operation or operations. The computer program instructions may be executed by a processor to cause a series of operational steps to be performed by the processor to produce a computer-implemented process such that the instructions, which execute on the processor to provide steps for implementing the actions specified in the flowchart operation or operations. The computer program instructions may also cause at least some of the operational steps shown in the operations of the flowchart to be performed in parallel. Moreover, some of the steps may also be performed across more than one processor, such as might arise in a multi-processor computer system or even a group of multiple computer systems. In addition, one or more operations or combinations of operations in the flowchart illustration can also be performed concurrently with other operations or combinations of operations, or even in a different sequence than illustrated without departing from the scope or spirit of the invention.

Accordingly, operations of the flowchart illustration support combinations of means for performing the specified actions, combinations of steps for performing the specified actions and program instruction means for performing the specified actions. It will also be understood that each operation of the flowchart illustration, and combinations of operations in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

The invention claimed is:

1. A system comprising:
   a transceiver for communicating over a network;
   a memory for storing at least instructions;
   a processor device that is operative to execute program instructions;
   a training database comprising training data comprising
      a list of company engagements from a client user, and, for each engagement, a company identifier, wherein the list comprises client won company engagements,
      company entity data mapped to each company engagement, the company entity data comprising firmographic data from a business entity information database, and
      non-customer company data from the business entity information database, the non-customer company data comprising company engagements for the non-customer company and company entity data mapped to each non-customer company engagement, wherein the non-customer company engagements include non-company won engagements, the non-customer company entity data comprising the firmographic data from the business entity information database;
      wherein the non-customer company engagement data including the won engagements is mapped to the company engagement data including the client won engagements for the client user;
   a classification engine comprising at least one classifier configured to identify company prospects, the classification engine being configured to train the at least one classifier on the training data in the training database to identify one or more attractive classes and one or more unattractive classes to classify company prospects.

2. The system of claim 1, wherein the list of company engagements comprises a list of customers.

3. The system of claim 2, wherein the list of company engagements comprises, for at least one of the engagements, at least one of:
   a begin time for when the company became a customer;
   a customer revenue value;
   one or more employee identifiers.

4. The system of claim 2, wherein the list of won company engagements comprises at least one of:
   a sale of a product or service; and
   a response to a marketing message.

5. The system of claim 1 wherein the training database comprises a list of lost company engagements.

6. The system of claim 1 wherein the classification engine includes a machine learning classifier model builder selected from the group of: a decision tree, a random forest modeler, a cluster modeler, a K Means Cluster modeler a neural net, a gradient boosted trees machine modeler, and a support vector machine (SVM).

7. The system of claim 6 wherein the classification engine comprises: a company profile classifier trained on the training database and configured to identify one or more company profile company classifications, including at least one company profile based on at least one of the attractive classes.

8. The system of claim 7 wherein the classification engine includes a machine learning classifier model builder comprising a K-Means Cluster modeler.

9. The system of claim 8 wherein the machine learning classifier builder is configured to train the at least one classifier on firmographic data from a begin time for company win or loss engagements.

10. The system of claim 6 comprising:
a prediction engine comprising the at least one classifier, the prediction engine being configured to calculate a probability score for a company prospect classification.

11. The system of claim 10 wherein the at least one classifier for the prediction engine is trained on a random forest decision tree.

12. The system of claim 5 wherein the list of company engagements comprises one or more employee identifiers and the system is configured to train the at least one classifier to classify company prospects including the one or more employee identifiers.

13. The system of claim 12 wherein a classifier model builder is configured to train at least one classifier for a prediction engine, the prediction engine being configured to calculate a probability score for a company prospect classification for the one or more company employee identifiers.

14. The system of claim 13 wherein the system is configured to at least:
access the business entity database to obtain employee data for the company prospect, and
provide a client user with a plurality of the scored prospects that includes the employee data for the company prospect.

15. A method being performed by a computer system that comprises one or more processors, a memory operatively coupled to at least one of the processors, and a computer-readable storage medium encoded with instructions executable by at least one of the processors and operatively coupled to at least one of the processors, the method comprising:
receiving into memory a company engagement database comprising a list of company engagements for a client user, wherein the list comprises won company engagements;
compiling a training database comprising training data comprising
company entity data linked to each company in the list, the company entity data comprising firmographic data from a business entity information database; and
non-customer company data from the business entity information database, the non-customer company data comprising company engagement data for the non-customer company, and company entity data linked to each non-customer company engagement, wherein the non-customer company engagement includes non-company won engagements, the non-customer company entity data comprising the firmographic data from the business entity information database, wherein the non-customer company engagement data including the won engagements is mapped to the company engagement data for the client user;
training at least one classifier on the training data in the training database to train the at least one classifier to identify one or more attractive classes and one or more unattractive classes to classify company prospects;
outputting the at least one classifier to a classification engine;
running the at least one classifier on a database comprising the company entity data and the firmographic data to identify prospect companies classified as attractive; and
outputting a database of company prospects to a client user interface.

16. The method of claim 15 wherein the list of company engagements comprises a list of customers.

17. The method of claim 15 wherein the training database comprises a list of lost company engagements.

18. The method of claim 15 wherein the method comprises:
training the at least one classifier on a machine learning classifier model builder selected from the group of: a decision tree, a random forest modeler, a cluster modeler, a K means cluster modeler, neural net, a gradient boosted trees machine modeler, and support vector machines (SVM).

19. The method of claim 15 wherein the method comprises:
training a company profile classifier configured to identify one or more company profile company classifications, including at least one company profile based on at least one of the one or more attractive classes.

20. The method of claim 15 wherein the method comprises:
training the company profile classifier on a machine learning classifier model builder comprising a K-Means Cluster modeler.

21. The method of claim 19 wherein the database comprising the company entity data and the firmographic data is the business entity information database.

22. The method of claim 15 comprising:
training at least one classifier for a prediction engine, the prediction engine being configured to calculate a probability score for a company prospect classification.

23. The method of claim 22 comprising:
training the at least one classifier for the prediction engine on a random forest decision tree.

24. The method of claim 22 wherein the database comprising the company entity data and the firmographic data is a database compiled from new company prospects and the firmographic data for the company prospects from business entity information database.

25. The method of claim 15 wherein the list of company engagements comprises one or more employee identifiers and the system is configured to train the at least one classifier to classify company prospects including a company employee identifier.

26. The method of claim 25 wherein the method comprises training at least one classifier for a prediction engine, the prediction engine being configured to calculate a probability score for a company prospect classification for the company employee identifier.

27. The method of claim 25 wherein the method comprises:
accessing the business entity database for employee data, the employee data comprising at least one of contact data or cookie data; and
providing the user interface for a client user with a plurality of scored prospects that includes the employee data for the company prospect.

28. A computer program product including non-transitory computer readable memory encoded with instructions executable by a computer system that, when executed by at least one processor of the computer system, performs the method comprising:
receiving into a memory a company engagement database comprising a list of company engagements for a client user, wherein the list comprises client won company engagements;

compiling a training database comprising training data comprising
   company entity data linked to each company, the company entity data comprising firmographic data from a business entity information database, and
   non-customer company data from the business entity information database, the non-customer company data comprising non-customer company engagement data and company entity data linked to each company engagement, wherein the non-customer company engagements include non-company won engagements, the company entity data comprising the firmographic data from the business entity information database, wherein the non-customer company engagement data including the won engagements is mapped to the company engagement data including the client won engagements for the client user;
training at least one classifier on the training data in the training database to train the at least one classifier to identify one or more attractive classes and one or more unattractive classes to classify company prospects;
outputting the at least one classifier to a classification engine;
running the at least one classifier on a database comprising the company entity data and the firmographic data to identify prospect companies classified as attractive; and
outputting a database of company prospects to a client user interface.

29. The system of claim 1, wherein the non-customer company data includes won company engagement data and lost company engagement data.

30. The system of claim 10, wherein the prediction engine is configured to calculate a sales revenue associated with at least one of the classes.

31. The system of claim 30 wherein the predictive engine is configured to calculate a negative revenue for an unattractive class.

32. The system of claim 1 wherein the system is configured to run the at least one classifier on a database comprising the company entity data and the firmographic data to classify companies not included in the list of company engagements.

* * * * *